United States Patent
Hong et al.

(10) Patent No.: US 10,950,847 B2
(45) Date of Patent: Mar. 16, 2021

(54) HIGH CAPACITY ELECTRODES

(71) Applicant: SOUTH DAKOTA BOARD OF REGENTS, Pierre, SD (US)

(72) Inventors: Haiping Hong, Rapid City, SD (US); David R. Salem, Rapid City, SD (US); Gregory Lee Christensen, Pierre, SD (US); Ruidong Yang, Pierre, SD (US)

(73) Assignee: South Dakota Board of Regents, Pierre, SD (US)

( * ) Notice: Subject to any disclaimer, the term of this patent is extended or adjusted under 35 U.S.C. 154(b) by 0 days.

(21) Appl. No.: 15/492,153

(22) Filed: Apr. 20, 2017

(65) Prior Publication Data
US 2017/0222212 A1    Aug. 3, 2017

Related U.S. Application Data

(63) Continuation of application No. 14/696,435, filed on Apr. 25, 2015, now Pat. No. 9,666,861.
(Continued)

(51) Int. Cl.
*H01M 4/133* (2010.01)
*H01M 4/36* (2006.01)
(Continued)

(52) U.S. Cl.
CPC ........ *H01M 4/133* (2013.01); *H01M 4/0404* (2013.01); *H01M 4/0419* (2013.01);
(Continued)

(58) Field of Classification Search
CPC ........ H01M 4/362; H01M 4/52; H01M 4/525; H01M 4/505; H01M 4/485; H01M 4/583;
(Continued)

(56) References Cited

U.S. PATENT DOCUMENTS 3,915,751 A   10/1975  Sanekata et al.
7,390,214 B2   6/2008  Tsiang
(Continued)

FOREIGN PATENT DOCUMENTS

CN   1743387 A   3/2006
CN   1803858 A   7/2006
(Continued)

OTHER PUBLICATIONS

"Ultracapactiors Made of Carbon Nanotubes and Graphene are High-Functioning, yet Cheap", http://newsmaine.net/19097-ultracapacitors-made-carbon-nanotubes-and-graphene-are-high-functioning, yet cheap/maine news, submitted by Michael Beigler Apr. 23, 2014.
(Continued)

*Primary Examiner* — Matthew J Merkling
(74) *Attorney, Agent, or Firm* — McKee, Voorhees & Sease, PLC

(57) ABSTRACT

An electrode comprises carbon nanoparticles and at least one of metal particles, metal oxide particles, metalloid particles and/or metalloid oxide particles. A surfactant attaches the carbon nanoparticles and the metal particles, metal oxide particles, metalloid particles and/or metalloid oxide particles to form an electrode composition. A binder binds the electrode composition such that it can be formed into a film or membrane. The electrode has a specific capacity of at least 450 mAh/g of active material when cycled at a charge/discharge rate of about 0.1C.

28 Claims, 6 Drawing Sheets

Related U.S. Application Data

(60) Provisional application No. 62/094,709, filed on Dec. 19, 2014, provisional application No. 61/984,118, filed on Apr. 25, 2014.

(51) Int. Cl.

| | | |
|---|---|---|
| H01M 4/52 | (2010.01) | |
| H01M 4/62 | (2006.01) | |
| H01M 4/04 | (2006.01) | |
| H01M 4/38 | (2006.01) | |
| H01M 4/485 | (2010.01) | |
| H01M 4/505 | (2010.01) | |
| H01M 4/525 | (2010.01) | |
| H01M 4/583 | (2010.01) | |
| H01M 10/052 | (2010.01) | |
| H01M 4/131 | (2010.01) | |
| H01M 4/134 | (2010.01) | |
| H01M 4/1391 | (2010.01) | |
| H01M 4/1393 | (2010.01) | |
| H01M 4/66 | (2006.01) | |
| H01M 4/70 | (2006.01) | |
| H01M 10/0525 | (2010.01) | |
| H01M 10/0585 | (2010.01) | |
| B82Y 30/00 | (2011.01) | |
| H01M 4/587 | (2010.01) | |
| H01M 4/02 | (2006.01) | |

(52) U.S. Cl.
CPC ......... *H01M 4/0471* (2013.01); *H01M 4/131* (2013.01); *H01M 4/134* (2013.01); *H01M 4/1391* (2013.01); *H01M 4/1393* (2013.01); *H01M 4/362* (2013.01); *H01M 4/364* (2013.01); *H01M 4/38* (2013.01); *H01M 4/386* (2013.01); *H01M 4/387* (2013.01); *H01M 4/485* (2013.01); *H01M 4/505* (2013.01); *H01M 4/52* (2013.01); *H01M 4/523* (2013.01); *H01M 4/525* (2013.01); *H01M 4/583* (2013.01); *H01M 4/62* (2013.01); *H01M 4/622* (2013.01); *H01M 4/623* (2013.01); *H01M 4/661* (2013.01); *H01M 4/70* (2013.01); *H01M 10/052* (2013.01); *H01M 10/0525* (2013.01); *H01M 10/0585* (2013.01); *B82Y 30/00* (2013.01); *H01M 4/587* (2013.01); *H01M 2004/028* (2013.01)

(58) Field of Classification Search
CPC ........ H01M 4/38; H01M 4/387; H01M 4/386; H01M 4/623
See application file for complete search history.

(56) References Cited

U.S. PATENT DOCUMENTS

| | | |
|---|---|---|
| 7,479,344 B1 | 1/2009 | McDermott |
| 7,531,267 B2 | 5/2009 | Kim |
| 7,803,262 B2 | 9/2010 | Haik et al. |
| 8,075,799 B2 | 12/2011 | Hong et al. |
| 8,110,521 B2 | 2/2012 | Lee et al. |
| 8,420,258 B2 | 4/2013 | Rojeski |
| 8,507,135 B2 | 8/2013 | Grupp |
| 8,715,853 B1 | 5/2014 | Vajo et al. |
| 8,816,193 B2 | 8/2014 | Hayashi et al. |
| 8,828,582 B2 | 9/2014 | Borden |
| 2002/0055038 A1 | 5/2002 | Aihara et al. |
| 2006/0127773 A1 | 6/2006 | Kawakami et al. |
| 2008/0302998 A1 | 12/2008 | Hong et al. |
| 2009/0081544 A1 | 3/2009 | Zhang et al. |
| 2010/0025327 A1 | 2/2010 | Cote et al. |
| 2010/0025627 A1 | 2/2010 | Naoi et al. |
| 2010/0055568 A1 | 3/2010 | Kim et al. |
| 2010/0075137 A1 | 3/2010 | Sinton et al. |
| 2010/0143798 A1 | 6/2010 | Zhamu et al. |
| 2011/0059333 A1 | 3/2011 | Yeh |
| 2011/0159372 A1 | 6/2011 | Zhamu et al. |
| 2011/0165321 A1 | 7/2011 | Zhamu et al. |
| 2011/0171364 A1* | 7/2011 | Xing ...................... B82Y 30/00 427/77 |
| 2012/0028170 A1 | 2/2012 | Sarlak et al. |
| 2012/0040244 A1 | 2/2012 | Kwon et al. |
| 2012/0052386 A1 | 3/2012 | Ookita et al. |
| 2012/0064409 A1 | 3/2012 | Zhamu et al. |
| 2012/0244428 A1 | 9/2012 | Park et al. |
| 2013/0065050 A1 | 3/2013 | Chen et al. |
| 2013/0224452 A1 | 8/2013 | Ramaprabhu et al. |
| 2013/0224603 A1 | 8/2013 | Chen et al. |
| 2013/0273421 A1 | 10/2013 | Matsumura et al. |
| 2013/0309484 A1 | 11/2013 | Sailor et al. |
| 2013/0316179 A1 | 11/2013 | Orikasa |
| 2014/0013584 A1 | 1/2014 | Wang et al. |
| 2014/0048738 A1 | 2/2014 | Xia et al. |
| 2014/0050969 A1 | 2/2014 | Rust, III et al. |
| 2014/0065464 A1 | 3/2014 | Masarapu et al. |
| 2014/0093771 A1 | 4/2014 | Wang et al. |
| 2014/0248533 A1 | 9/2014 | Golightly et al. |
| 2014/0272584 A1* | 9/2014 | Jiang ...................... H01M 4/58 429/220 |
| 2014/0349172 A1 | 11/2014 | Mui et al. |
| 2014/0370369 A1 | 12/2014 | Borden |
| 2015/0086827 A1 | 3/2015 | Sun et al. |
| 2015/0086830 A1 | 3/2015 | Sun et al. |
| 2015/0140377 A1 | 5/2015 | Waterford et al. |
| 2015/0248972 A1 | 9/2015 | Tang et al. |

FOREIGN PATENT DOCUMENTS

| | | |
|---|---|---|
| CN | 1835263 A | 9/2006 |
| CN | 101219378 A | 7/2008 |
| CN | 101480612 A | 7/2009 |
| CN | 101492159 A | 7/2009 |
| CN | 101497435 A | 8/2009 |
| CN | 101499341 A | 8/2009 |
| CN | 101503579 A | 8/2009 |
| CN | 101658933 A | 3/2010 |
| CN | 101709436 A | 5/2010 |
| CN | 1011712452 A | 5/2010 |
| CN | 101781757 A | 7/2010 |
| CN | 101818280 A | 9/2010 |
| CN | 101940910 A | 1/2011 |
| CN | 101941842 A | 1/2011 |
| CN | 102903930 A | 1/2013 |
| CN | 202905851 U | 4/2013 |
| CN | 203013829 U | 6/2013 |
| CN | 103456902 A | 12/2013 |
| CN | 103855337 A | 6/2014 |
| EP | 1304755 A2 | 4/2003 |
| EP | 2163517 A1 | 3/2010 |
| JP | 2001210285 A | 8/2001 |
| JP | 2006164810 A | 6/2006 |
| JP | 2006228450 A | 8/2006 |
| JP | 2007311279 A | 11/2007 |
| JP | 2009199744 A | 9/2009 |
| JP | 2014019619 A | 2/2014 |
| JP | 201441716 A | 3/2014 |
| JP | 2014067523 A | 4/2014 |
| JP | 2014096225 A | 5/2014 |
| JP | 2014170648 A | 9/2014 |
| KR | 20040103706 A | 12/2004 |
| KR | 20050021662 A | 3/2005 |
| KR | 100701627 B1 | 3/2007 |
| KR | 20070076686 A | 7/2007 |
| KR | 2008091883 A | 10/2008 |
| KR | 20090092619 A | 9/2009 |
| KR | 20100138607 | 12/2010 |
| KR | 20110037055 A | 4/2011 |
| KR | 20110047644 A | 5/2011 |
| TW | 201006767 A | 2/2010 |
| WO | 0229917 A1 | 4/2002 |

(56) References Cited

FOREIGN PATENT DOCUMENTS

| WO | 2012024330 A2 | 2/2012 |
|---|---|---|
| WO | 2012037502 A2 | 3/2012 |
| WO | 2012118434 A1 | 9/2012 |
| WO | 2013099520 A1 | 7/2013 |
| WO | 2013146300 A1 | 10/2013 |
| WO | 2013166598 A1 | 11/2013 |
| WO | 2015043359 A1 | 4/2015 |

OTHER PUBLICATIONS

South Dakota Board of Regents, PCT/US2015/027682 filed on Apr. 25, 2015, "Notification Concerning Transmittal of International Preliminary Report on Patentability Chapter 1 of the Patent Cooperation Treaty", dated Nov. 3, 2016.

South Dakota Board of Regents, PCT/US2015/027682 filed on Apr. 25, 2015, "Notification of Transmittal of the International Search Report and the Written Opinion of the International Searching Authority, or the Declaration", dated Jun. 26, 2015.

South Dakota Board of Regents, European Patent Office, "Communication pursuant to Rules 161(1) and 162 EPC", dated Dec. 9, 2016.

Zhang, Zhian, "Effect of Triton X-100 as Dispersant on Carbon Black for LiFePO Cathode", School of Metallurgical—Science and Engineering, Central South University, Changsha 410083, China, May 1, 2013.

South Dakota Board of Regents, "Examination report No. 1 for standard patent application", pp. 1-3, Jun. 21, 2017.

Georgakilas, Vasilios, et al. "Attachment of Magnetic Nanoparticles on Carbon Nanotubes and Their Soluble Derivatives", Chemistry of Materials, vol. 17, No. 7, Apr. 5, 2005, pp. 1613-1617.

Jiang, Jian, et al. "Recent Advances in Metal Oxide-based Electrode Architecture Design for Electrochemical Energy Storage", Advanced Materials, 2012, 24, pp. 5166-5180.

Koo, Bonil, et al. "Hollow Iron Oxide Nanoparticles for Application in Lithium Ion Batteries", NANO Letters, 2012, 12, pp. 2429-2435.

Merkoci, Arben, et al., "New Materials for electrochemical sensing VI: Carbon Nanotubes", Trends in analytical Chemistry (2005) vol. 24, No. 9, pp. 826-838.

Rakhi, R.B., et al. "Electrochemical Energy Storage Devices Using Electrodes Incorporation Carbon Nanocoils and metal Oxides Nanoparticles", The Journal of Physical Chemistry (2011), 115, pp. 14392-14399.

Reddy, Arava Leela Mohana, et al., "Coaxial MnO2/Carbon Nanotube Array Electrodes for High-Performance Lithium Batteries", NANO Letters (2009) vol. 9, No. 3, pp. 1002-1006.

Reddy, Arava Leela Mohana, et al., "Nanocrystalline Metal Oxides Dispersed Multiwalled Carbon Nanotubes as Super capacitor Electrodes", J. Phys. Chem. (2007) 111, pp. 7727-7734.

Wu, Ping, et al., "Carbon Nanocapsules as Nanoreactors for Controllable Synthesis of Encapsulated Iron and Iron Oxides: Magnetic Properties and Reversible Lithium Storage", The Journal of Physical Chemistry, (2011), 115, pp. 3612-3620.

Zheng, Shu-Fa, et al., "Introducing Dual Functional CNT Networks into CuO Nanomicrospheres toward Superior Electrode Materials for Lithium-Ion Batteries", Chem Mater (2008), 20, pp. 3617-3622.

Zhi, Liinjie, et al., "Precursor-Controlled Formation of Novel Carbon/Metal and Carbon/Metal Oxide Nanocomposites", Advanced Materials (2008), 20, pp. 1727-1731.

Zhou, Jisheng, et al., "Carbon-Encapsulated Metal Oxide Hollow Nanoparticles and Metal Oxide Hollow Nanoparticles: A General Synthesis Strategy and its Application to Lithium-Ion Batteries", Chem. Mater. (2009), 21, pp. 2935-2940.

South Dakota Board of Regents, PCT/US2015/027682, filed Apr. 25, 2015, "The International Search Report and the Written Opinion", dated Aug. 26, 2015.

CN1743387A—English Translation.
CN1803858A—English Translation.
CN1835263A—English Translation.
CN101492159A—English Translation.
CN101497435A—English Translation.
CN101503579A—English Translation.
CN101658933A—English Translation.
CN101709436A—English Translation.
CN101712452A—English Translation.
CN101781757A—English Translation.
CN101818280A—English Translation.
CN101940910A—English Translation.
CN101941842A—English Translation.
JP2006-228450A—English Translation.
KR2011-0037055A—English Translation.
KR2011-0047644A—English Translation.
TW2010-06767A—English Translation.
Machine Translation of Tomoni, JP 2007-311279, published Nov. 2007, pp. 1-14.

* cited by examiner

HIGH CAPACITY ELECTRODES

CROSS-REFERENCE TO RELATED APPLICATIONS

This application is a Continuation application of U.S. Ser. No. 14/696,435, filed Apr. 25, 2015, which is related to and claims priority benefits from U.S. provisional patent application Ser. No. 61/984,118 filed on Apr. 25, 2014, and from U.S. provisional patent application Ser. No. 62/094,709 filed on Dec. 19, 2014.

FIELD OF THE INVENTION

The present invention relates to electrochemical compositions and methods of preparing those compositions. The compositions being a non-aggregating, preferably homogenous, integration of carbon nanomaterials with metal oxides, metal, metalloid, and/or metalloid oxide particles for use as high performance electrodes.

BACKGROUND OF THE INVENTION

Lithium-ion batteries are currently the most popular rechargeable batteries due to their high energy densities, relatively high cell voltages, and low weight-to-volume ratios. However, the voltage, charge capacity, battery life, and rechargeability of lithium-ion batteries have increased by relatively small increments over the past decade.

One issue in developing new battery technology is choosing suitable electrode composition(s). Electrochemically active metal oxides such as $Fe_2O_3$, $Mn_2O_3$ and $Co_2O_3$, graphite and silicon (Si), have long been investigated for use as anode materials for lithium-ion batteries because of their high theoretical capacities. Silicon, as well as many metal oxides typically exhibits a significant irreversible capacity loss in its first cycle and rapid capacity fade during cycling. A cycle refers to one charge and one discharge. Existing commercial anodes often have a specific capacity of between about 300 and 400 mAh/g when cycled at a charge/discharge rate of about 0.1C and often suffer from irreversible loss. Thus, it has been difficult to achieve a specific capacity of more than about 400 mAh/g when cycled at a charge/discharge rate of about 0.1C or higher over multiple charge/discharge cycles.

Furthermore, a large specific volume change commonly occurs during the cycling processes, which can lead to pulverization of the electrodes and rapid capacity decay. Furthermore swelling and contraction of silicon can affect the structure and properties of the electrodes.

It has been thought that the application of nanomaterials, particularly nanotubes, in batteries can offer vast improvements. Nanoparticles can include submicron (usually less than 1000 nm) carbon materials and/or nanoscale (usually less than 100 nm) carbon materials. The nanoparticles preferably have at least one dimension that is less than 500 nm, more preferably less than 100 nm and sometimes no greater than about 1 nm. Nanoparticles include, for example, nanospheres, nanorods, nanocups, nanowires, nanoclusters, nanofibers, nanolayers, nanotubes, nanocrystals, nanobeads, nanobelts and nanodisks.

Nanotubes are cylindrical structures formed by nanoparticles such as carbon-based nanoparticles. Nanotubes can be single-walled nanotubes ("SWNT"), multi-walled nanotubes ("MWNT") which includes double-walled nanotubes ("DWNT"), or a combination of the same. When the nanotube is carbon-based the abbreviation can be modified by a "C-," for example, C-SWNT and C-MWNT.

The structure of a single-walled carbon nanotube can be described as a single graphene sheet rolled into a seamless cylinder with ends that are either open, or capped by either half fullerenes or more complex structures such as pentagons. Multi-walled carbon nanotubes contain two or more nanotubes that are concentrically nested, like rings of a tree trunk, with a typical distance of about 0.34 nm between layers.

Nanomaterials have broad industrial applications, including transparent electrodes for displays and solar cells, electromagnetic interference shielding, and sensors. Nanoparticles, and specifically conductive nanoparticles of carbon, metals and the like, have been known and used for years in the fields of semiconductors and electronic devices. Examples of such particles and processes are provided in U.S. Pat. Nos. 7,078,276; 7,033,416; 6,878,184; 6,833,019; 6,585,796; 6,572,673; and 6,372,077. The advantages of having ordered nanoparticles in these applications are also well established (see, for example, U.S. Pat. No. 7,790,560).

Nanoparticles of various materials have been selected for a range of applications based on their various thermal and electrical conductivity properties. Among the nanoparticles often used are carbon nanoparticles: nanoparticles that are primarily composed of carbon atoms, including diamond, graphite, graphene, fullerenes, carbon nanotubes (including C-SWNT and C-MWNT), carbon nanotube fiber (carbon nanotube yarn), carbon fibers, and combinations thereof, which are not magnetically sensitive. Carbon nanoparticles include those particles with structural defects and variations, tube arrangements, chemical modification and functionalization, surface treatment, and encapsulation.

In particular, carbon nanotubes are very promising due to their chemical stability combined with electrical and thermal conductivity. Carbon nanotubes are long thin cylindrical macromolecules and thus have a high aspect ratio (ratio of the length over the diameter of a particle).

Nanoparticles, and in particular nanotubes, can enhance the strength, elasticity, toughness, electrical conductivity and thermal conductivity of various compositions. In certain applications the use of carbon nanotubes in materials is desirable yet hard to achieve. For example, nanotubes have a tendency to aggregate (also referred to as bundle or agglomerate), which impairs their dispersion. Non-uniform dispersion can give rise to a variety of problems, including reduced and inconsistent tensile strength, elasticity, toughness, electrical conductivity, and thermal conductivity. Generally, preparation of most materials incorporating single-walled carbon nanotubes and/or multi-walled carbon nanotubes has been directed at achieving well-dispersed nanotubes in polymers using methods such as mechanical mixing, melt-blending, solvent blending, in-situ polymerization, and combinations of the same. Attempts to create homogenous aqueous dispersions of single-walled and multi-walled carbon nanotubes have involved using certain water-soluble polymers that interact with the nanotubes to give the nanotubes solubility in aqueous systems such as the systems described in International (PCT) Publication No. WO 02/016257. However, these attempts have not been able to reach the desired dispersion due to multiple factors. Nanoparticles, particularly multi-walled, double-walled and single-walled carbon nanotubes, have a tendency to aggregate, which leads to non-uniform dispersion. Furthermore nanoparticles, and in particular nanotubes, often have relatively fragile structures that are damaged by many of the existing physical dispersion methods, such as mixing and intense or extended ultrasonication. In addition, it is believed that the geometrical shape of many nanoparticles and intramolecular forces contribute to a tendency for less uniform dispersion.

Previous attempts have been made to disperse nanoparticles and metal oxides in fluids (see, for example, U.S. Patent Application Publication No. US2008/0302998). However, these attempts did not address the proper dispersion of carbon nanomaterials and metal oxides and/or metal particles for desirable electrical conductivity and the formation of solid electrodes. Similarly, although U.S. Pat. No. 8,652,386 describes magnetic alignment of carbon nanotubes in nanofluids such as nanogreases and nanolubricants by employing metal oxides in the fluids, the prior art has been silent on the successful homogenous dispersion and integration of carbon nanomaterials with metal oxides and/or metal and/or metalloid particles in useful materials such as electrodes. Integration refers to when the ion absorbing particles are combined in an integrated fashion so that they are attached to the carbon nanoparticles.

U.S. Patent Application Publication No. US 2013/0224603 discusses electrodes comprising a mesa-porous graphene cathode and an anode comprising an active material for inserting and extracting lithium mixed with a conductive filler and/or resin binder. However, the methods disclosed have several limitations including construction of the anode in a conventional manner involving simple mixing of the components, and does not include any method of providing uniform dispersion of the active material or robust attachment of the active material to the conductive filler.

Similarly U.S. Pat. No. 8,580,432 discusses a composition for lithium-ion battery electrode applications comprising a lithium-ion conductive material in the form of submicron particles, rods, wires, fibers or tubes combined with nano-graphene platelets and incorporated in a protective matrix material. However, the patent does not disclose a method of ensuring uniform dispersion of the components or homogeneous distribution of the submicron additives and nano-graphene platelets in the matrix material.

Attempts to disperse carbon nanoparticles have included the use of nanotubes functionalized with magnetically sensitive groups including Ni-coated nanotubes. However, this approach failed as the functionalized nanotubes were found to suffer a decrease in electrical conductivity, strength and other mechanical properties in part due to the fact that once functionalized, the conjugated structure of the nanotubes is broken, which results in changes in surface properties.

Thus, it remains a serious technical challenge to effectively and efficiently disperse carbon nanotubes into a non-aggregating, preferably homogenous and uniform, integration with metal oxides and/or metal particles and/or silicon and/or silicon oxides, thereby providing materials having consistent electrical conductivity properties and/or improved capacitance for high performance energy storage systems.

There is a need for novel methods to develop essentially homogenous and uniform integration of electrically conducting carbon nanoparticles such as nanotubes and graphene for high performance electrodes in such a way that the integrity and functionality of the electrode is not affected by volume changes in the ion-absorbing component. This would potentially significantly enhance the capacity, performance, and lifetime of energy storage systems. In one of the embodiments described below, carbon nanoparticles are integrated with at least one of metals, metal oxides, silicon and/or silicon oxides for use as electrodes.

BRIEF SUMMARY OF THE INVENTION

The present electrodes comprise carbon nanoparticles, at least one of metal, metal oxide, metalloid, and/or metalloid oxide particles, a surfactant for attaching the carbon nanoparticles to at least one of metal, metal oxide, metalloid, and/or metalloid oxide particles to form an electrode composition, and a binder to form the electrode composition into a film. The electrodes can have a specific capacity of at least 450 mAh/g of active material when cycled at a charge/discharge rate of about 0.1C.

DETAILED DESCRIPTION OF EMBODIMENT(S)

Figure 1:
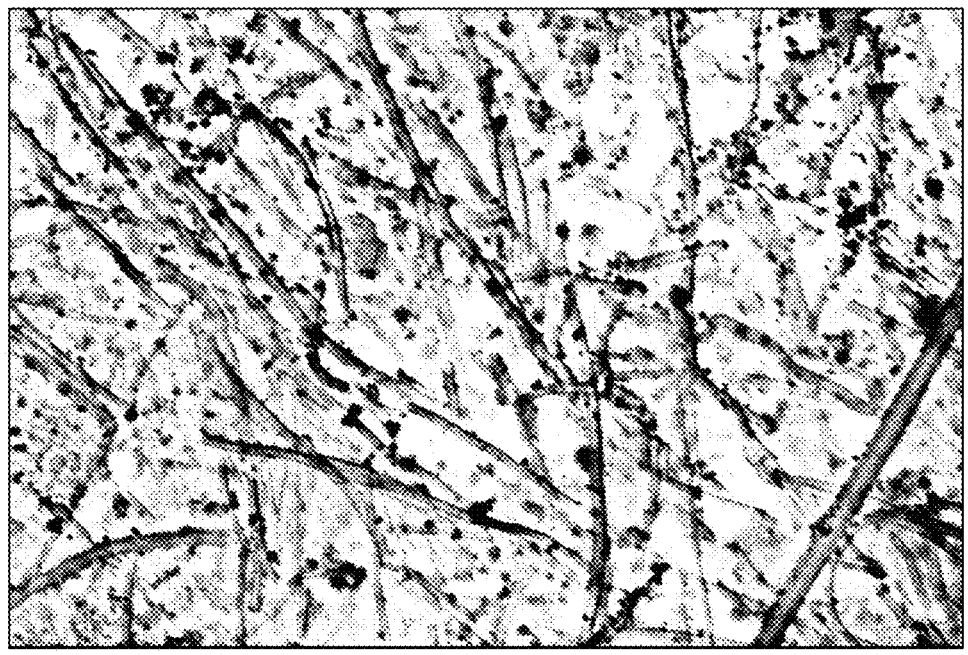
FIG. 1 shows a scanning electron microscope (SEM) image of iron oxide ($Fe_2O_3$) nanoparticles dispersed and attached on the carbon nanofibers without substantial aggregation. The surfactant used was sodium dodecylbenzene sulfonate.

The present electrode compositions have high capacity and high performance in energy storage systems. The presently disclosed electrode compositions comprise carbon nanoparticles or nanotubes attached to metal oxides, metal particles, metalloid particles and/or metalloid oxides in a non-aggregating, preferably homogeneous and uniform, dispersion.

The ranges recited are meant to identify all integers and fractions encompassed within the ranges.

Electrode Compositions

Non-aggregating, preferably homogenously dispersed, carbon nanomaterials such as carbon nanotubes with metal oxides, metal, metalloid, and/or metalloid oxide particles provide various benefits over other materials for use in electrodes. It is believed that the non-aggregation dispersion of nanoparticles improves the flow of ions or electrons and provides a more ordered structure which enhances various mechanical and electrical properties. This can result in improved structural properties of the material as a whole and thus improved physical properties, including, but not limited to, electrical conductivity, thermal conductivity, increased tensile modulus (stiffness), flexural modulus, tensile strength, flexural strength, elasticity, and toughness. Moreover, the dispersion and integration prevents or at least reduces the aggregation among the nanoparticles and leads to enhanced physical characteristics of the attached constituents.

The components in the present electrode compositions can be selected based upon their stability, solubility, thermophysical, electrical, mechanical, size, and zeta potential (for example, surface charge) properties.

Particular pH values can facilitate the dispersion of the nanoparticles and attaching the carbon nanoparticles to metal oxides and/or metal particles, and combinations of the same. In one embodiment, if the surfactant(s) have a net negative charge, the pH of the nanoparticle fluid is greater than about 5. In another embodiment, if the surfactant(s) have a net positive charge, the pH of the nanoparticle/host material mixture in solvent is less than about 10.

Carbon Nanoparticles

Carbon nanoparticles are included in the present electrode compositions. Carbon nanoparticles have high electrical conductivity, which often exceeds that of metallic materials. Carbon nanoparticles are inclusive of nanoparticles, including submicron nanofibers. Many forms of carbon nanoparticles are suitable for use in the present compositions, including activated carbon nanoparticles, porous carbon nanoparticles, carbon nanotubes, fullerenes, graphite, graphene, nanofibers, and combinations thereof.

Carbon nanotubes (CNTs), have a high heat transfer coefficient and high thermal conductivity, which often exceeds those of metallic materials. For example, C-SWNTs can exhibit a thermal conductivity value as high as 2000-6000 W/m-K under ideal circumstances. Many forms of CNTs can be used in the present compositions, including C-SWNTs, C-MWNTs, hollow carbon nanofibers, and combinations thereof.

In many nanotubes, particularly CNTs, the basic structural element is a hexagon, which is the same as that found in graphite. Based on the orientation of the tube axis with respect to the hexagonal lattice, a nanotube can have three different configurations: armchair, zigzag, and chiral (also known as spiral). In an armchair configuration, the tube axis is perpendicular to two of six carbon-carbon bonds of the hexagonal lattice. In a zigzag configuration, the tube axis is parallel to two of six carbon-carbon bonds of the hexagonal lattice. Both of these configurations are achiral. In a chiral configuration, the tube axis forms an angle other than 90 or 180 degrees with one of the six carbon-carbon bonds of the hexagonal lattice. Nanotubes of these configurations often exhibit different physical and chemical properties. For example, an armchair nanotube is usually metallic whereas a zigzag nanotube can be metallic or semi conductive depending on the diameter of the nanotube. All three different configurations are expected to be very good thermal conductors along the tube axis, exhibiting a property known as "ballistic conduction," but good insulators laterally to the tube axis.

In addition to the common hexagonal structure, the cylinder of nanotube molecules can also contain other size rings, such as pentagon, heptagon, and octagon. Replacement of some regular hexagons with other ring structures, such as pentagons and/or heptagons, can cause cylinders to bend, twist, or change diameter, and thus lead to some interesting structures such as Y-, T-, and X-junctions, and different chemical activities. Those various structural variations and configurations can be found in both SWNT and MWNT.

Nanotubes used in the present electrode compositions can be in the configuration of armchair, zigzag, chiral, or combinations thereof. The nanotubes can also contain structural elements other than hexagon, such as pentagon, heptagon, octagon, or combinations thereof.

Another structural variation for MWNT molecules is the arrangement of multiple nanotubes. An exemplary C-MWNT is like a stack of graphene sheets rolled up into concentric cylinders with each wall parallel to a central axis. However, the tubes can also be arranged so that an angle between the graphite basal planes and the tube axis is formed. Such MWNT, whether carbon-based or not, is known as a stacked cone, chevron, bamboo, ice cream cone, or piled cone structures. A stacked cone MWNT can reach a diameter of about 100 µm. In spite of these structural variations, many types of MWNTs are suitable for use in the present compositions.

The nanotubes that are used can also encapsulate other elements and/or molecules within their enclosed tubular structures. Such elements include Si, Ti, V, Cr, Mn, Fe, Co, Ni, Cu, Y, Zr, Mo, Ta, Au, Th, La, Ce, Pr, Nb, Gd, Tb, Dy, Ho, Er, Tm, Yb, Lu, Mo, Pd, Sn, and W. Such molecules include alloys of these elements such as alloys of cobalt with S, Br, Ph, Pt, Y, Cu, B, and Mg, and compounds such as carbides such as TiC and MoC. The presence of these elements, alloys and compounds within the core structure of the nanotubes can enhance the various properties, such as thermal and/or electrical conductivity.

Nanotubes are commercially available from a variety of sources. Many publications are available with sufficient information to allow one to manufacture nanotubes with desired structures and properties. Common techniques are arc discharge, laser ablation, chemical vapor deposition, and flame synthesis. Chemical vapor deposition has shown great promise in being able to produce larger quantities of nanotubes at lower cost. This is usually done by reacting a carbon-containing gas, such as acetylene, ethylene or ethanol, with a metal catalyst particle, such as cobalt, nickel, or ion, at temperatures above 600° C.

The selection of a particular nanotube depends on a number of factors. Factors include desired physical properties, such as electrical and thermal conductivity, mass, and tensile strength; cost effectiveness; solubility; and dispersion and settling characteristics. In some embodiments of the present materials, the nanotubes selected comprise, consist of, or consist essentially of CNTs. In other embodiments or the same embodiments, the nanotubes comprise, consist of, or consist essentially of SWNTs. In other embodiments, the nanotubes comprise, consist of, or consist essentially of multi-walled nanotubes (MWNTs). In yet other embodiments, the nanotubes comprise, consist of, or consist essentially of CNTs that are functionalized chemically.

In other embodiments, the carbon nanoparticles are single, bilayer or multilayer graphene. In yet other embodiments, the carbon nanoparticles can be single, bilayer or multilayer graphene oxide or other functionalized graphene.

In some embodiments the present compositions comprise between about 5 wt. % and 95 wt. % carbon nanoparticles. In some embodiments the present compositions comprise between about 10 wt. % and 75 wt. % carbon nanoparticles. In some embodiments the present compositions comprise between about 15 wt. % and 50 wt. % carbon nanoparticles.

Metal Oxide Particles

The present electrode compositions can further comprise metal oxide particles. In certain embodiments the metal oxide particles are nanoparticles. A metal oxide nanoparticle is a nanoscale particle that comprises one or more metal oxides. Suitable metal oxides include but are not limited to $Al_2O_3$, $CuO$, $MgO$, $V_2O_5$, $BiO_2$, $Sb_2O_5$, $TiO_2$, $ZnO$, $Fe_2O_3$, $Fe_3O_4$, $CrO_3$, $NiO$, $Ni_2O_3$, $CoO$, $Co_2O_3$, and $Co_3O_4$. Furthermore, unless specified, the chemical formula of a nanoparticle represents any of the possible crystalline forms and/or, where applicable, an amorphous form. For example, the chemical formula $Al_2O_3$ can represent alpha-, beta-, or gamma-aluminum oxide, or combinations thereof.

In some embodiments of the present compositions the metal oxide particles have a pH point of zero charge (pHpzc) of between 6 and 10, 7 and 10, 8 and 10, and 9 and 10, for example. Exemplary metal oxides, MgO, CuO, $Al_2O_3$, $Fe_2O_3$ and $Fe_3O_4$, have a pHpzc between about 6 and about 10. Silicon has a pHpzc between about 4 and about 5. "pHpzc" refers to the pH value of a fluid containing the metal oxideparticles, metal particles, metalloid particles, and/or metalloid oxide particles at which the metal oxide particles, metal particles, metalloid particles, and/or metalloid oxide particles exhibit a neutral surface charge.

In some embodiments of the present compositions metal oxides are between about 5 wt. % and 95 wt. % of the composition. In some embodiments metal oxides are between about 10 wt. % and 90 wt. % of the composition. In some embodiments metal oxides are between about 15 wt. % and 85 wt. % of the composition.

Metal Particles

The present electrode compositions can further comprise metal particles. In some embodiments the metal particles can be nanoparticles. Suitable metal particles include, but are not limited to lanthanides (for example, lanthanum, cerium, praseodymium, neodymium, promethium, samarium, europium, gadolinium, terbium, dysprosium, holmium, erbium, thulium, ytterbium, and lutetium), cobalt, vanadium, manganese, niobium, iron, nickel, copper, titanium, zirconium, tin, other rare earth metals such as scandium and yttrium, and combinations and alloys of the aforementioned metals and/or metal oxides. In some embodiments of the present materials the metal particles, include, but are not limited to, NdFeB, Fe and Ni.

In some embodiments of the present electrode compositions metal particles are between about 5 wt. % and 95 wt. % of the composition. In some embodiments metal oxides are between about 10 wt. % and 90 wt. % of the composition. In some embodiments metal oxides are between about 15 wt. % and 85 wt. % of the composition.

Metalloid Particles

The present electrode compositions can further comprise metalloid particles. In some embodiments the metalloid particles can be nanoparticles. Suitable metalloid particles include, but are not limited to boron, silicon, germanium, tellurium, and oxides, combinations, and alloys of the aforementioned metalloids. Suitable metalloid oxides include but are not limited to $SiO_2$, $GeO_2$, $B_2O_3$, and $TeO_2$ and/or, where applicable, amorphous forms. Furthermore, unless specified, the chemical formula of a nanoparticle represents any of the possible crystalline forms. For example, the chemical formula $B_2O_3$ can represent alpha- or beta-boron oxide, or combinations thereof.

In some embodiments of the present electrode compositions metalloid particles are between about 5 wt. % and 95 wt. % of the composition. In some embodiments metal oxides are between about 10 wt. % and 90 wt. % of the composition. In some embodiments metal oxides are between about 15 wt. % and 85 wt. % of the composition.

Surfactants

Surfactants are molecules or groups of molecules having surface activity, including wetting agents, dispersants, emulsifiers, detergents, and foaming agents. A variety of surfactants can be used in preparation of the present materials as a dispersant to facilitate uniform dispersion of nanoparticles in the material, and/or to enhance stabilization of such a dispersion. Typically, the surfactants used contain a lipophilic nonpolar hydrocarbon group and a polar functional hydrophilic group. The polar functional group can be a carboxylate, ester, amine, amide, imide, hydroxyl, ether, nitrile, phosphate, sulfate, or sulfonate. The surfactants can be used alone or in combination. Accordingly, a combination of surfactants can include anionic, cationic, nonionic, zwitterionic, amphoteric, and ampholytic surfactants, so long as there is a net positive or negative charge in the head regions of the population of surfactant molecules. In many instances, a single negatively charged or positively charged surfactant is used in the preparation of the present electrode compositions.

Accordingly, a surfactant used in preparation of the present electrode compositions can be anionic, including, but not limited to, sulfonates such as alkyl sulfonates, alkylbenzene sulfonates, alpha olefin sulfonates, paraffin sulfonates, and alkyl ester sulfonates; sulfates such as alkyl sulfates, alkyl alkoxy sulfates, and alkyl alkoxylated sulfates; phosphates such as monoalkyl phosphates and dialkyl phosphates; phosphonates; carboxylates such as fatty acids, alkyl alkoxy carboxylates, sarcosinates, isethionates, and taurates. Specific examples of carboxylates are sodium oleate, sodium cocoyl isethionate, sodium methyl oleoyl taurate, sodium laureth carboxylate, sodium trideceth carboxylate, sodium lauryl sarcosinate, lauroyl sarcosine, and cocoyl sarcosinate. Specific examples of sulfates include sodium dodecyl sulfate (SDS), sodium lauryl sulfate, sodium laureth sulfate, sodium trideceth sulfate, sodium tridecyl sulfate, sodium cocyl sulfate, and lauric monoglyceride sodium sulfate.

Suitable sulfonate surfactants include, but are not limited to, alkyl sulfonates, aryl sulfonates, monoalkyl and dialkyl sulfosuccinates, and monoalkyl and dialkyl sulfosuccinamates. Each alkyl group independently contains about two to twenty carbons and can also be ethoxylated with up to about 8 units, preferably up to about 6 units, on average, for example, 2, 3, or 4 units, of ethylene oxide, per each alkyl group. Illustrative examples of alky and aryl sulfonates are sodium tridecyl benzene sulfonate (STBS) and sodium dodecylbenzene sulfonate (SDBS).

Illustrative examples of sulfosuccinates include, but are not limited to, dimethicone copolyol sulfosuccinate, diamyl sulfosuccinate, dicapryl sulfosuccinate, dicyclohexyl sulfosuccinate, diheptyl sulfosuccinate, dihexyl sulfosuccinate, diisobutyl sulfosuccinate, dioctyl sulfosuccinate, C12-15 pareth sulfosuccinate, cetearyl sulfosuccinate, cocopolyglucose sulfosuccinate, cocoyl butyl gluceth-10 sulfosuccinate, deceth-5 sulfosuccinate, deceth-6 sulfosuccinate, dihydroxyethyl sulfosuccinylundecylenate, hydrogenated cottonseed glyceride sulfosuccinate, isodecyl sulfosuccinate, isostearyl sulfosuccinate, laneth-5 sulfosuccinate, laureth sulfosuccinate, laureth-12 sulfosuccinate, laureth-6 sulfosuccinate, laureth-9 sulfosuccinate, lauryl sulfosuccinate, nonoxynol-10 sulfosuccinate, oleth-3 sulfosuccinate, oleyl sulfosuccinate, PEG-10 laurylcitrate sulfosuccinate, sitosereth-14 sulfosuccinate, stearyl sulfosuccinate, tallow, tridecyl sulfosuccinate, ditridecyl sulfosuccinate, bisglycol ricinosulfosuccinate, di(1,3-di-methylbutyl)sulfosuccinate, and silicone copolyol sulfosuccinates.

Illustrative examples of sulfosuccinamates include, but are not limited to, lauramido-MEA sulfosuccinate, oleamido PEG-2 sulfosuccinate, cocamido MIPA-sulfosuccinate, cocamido PEG-3 sulfosuccinate, isostearamido MEA-sulfosuccinate, isostearamido MIPA-sulfosuccinate, lauramido MEA-sulfosuccinate, lauramido PEG-2 sulfosuccinate, lauramido PEG-5 sulfosuccinate, myristamido MEA-sulfosuccinate, oleamido MEA-sulfosuccinate, oleamido PIPA-sulfosuccinate, oleamido PEG-2 sulfosuccinate, palmitamido PEG-2 sulfosuccinate, palmitoleamido PEG-2 sulfosuccinate, PEG-4 cocamido MIPA-sulfosuccinate, ricinoleamido MEA-sulfosuccinate, stearamido MEA-sulfosuccinate, stearyl sulfosuccinamate, tallamido MEA-sulfosuccinate, tallow sulfosuccinamate, tallowamido MEA-sulfosuccinate, undecylenamido MEA-sulfosuccinate, undecylenamido PEG-2 sulfosuccinate, wheat germamido MEA-sulfosuccinate, and wheat germamido PEG-2 sulfosuccinate.

Some examples of commercial sulfonates are AEROSOL® OT-S, AEROSOL® OT-MSO, AEROSOL® TR70% (Cytec Inc., West Paterson, N.J.), NaSul CA-HT3 (King Industries, Norwalk, Conn.), and C500 (Crompton Co., West Hill, Ontario, Canada). AEROSOL® OT-S is sodium dioctyl sulfosuccinate in petroleum distillate. AEROSOL® OT-MSO also contains sodium dioctyl sulfosuccinate. AEROSOL® TR70% is sodium bistridecyl sulfosuccinate in mixture of ethanol and water. NaSul CA-HT3 is calcium dinonylnaphthalene sulfonate/carboxylate complex. C500 is an oil soluble calcium sulfonate.

Alkyl or alkyl groups refers to saturated hydrocarbons having one or more carbon atoms, including straight-chain alkyl groups (for example, methyl, ethyl, propyl, butyl, pentyl, hexyl, heptyl, octyl, nonyl, decyl, and so on), cyclic alkyl groups (or cycloalkyl or alicyclic or carbocyclic groups) (for example, cyclopropyl, cyclopentyl, cyclohexyl, cycloheptyl, cyclooctyl, and so on), branched-chain alkyl groups (for example, isopropyl, tert-butyl, sec-butyl, isobutyl, and so on), and alkyl-substituted alkyl groups (for example, alkyl-substituted cycloalkyl groups and cycloalkyl-substituted alkyl groups).

Alkyl can include both unsubstituted alkyls and substituted alkyls. Substituted alkyls refers to alkyl groups having substituents replacing one or more hydrogens on one or more carbons of the hydrocarbon backbone. Such substituents can include, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl or aromatic (including heteroaromatic) groups.

In some embodiments, substituted alkyls can include a heterocyclic group. Heterocyclic groups include closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran and furan.

For an anionic surfactant, the counter ion is typically sodium but can alternatively be potassium, lithium, calcium, magnesium, ammonium, amines (primary, secondary, tertiary or quandary) or other organic bases. Exemplary amines include isopropylamine, ethanolamine, diethanolamine, and triethanolamine. Mixtures of the above cations can also be used.

A surfactant used in preparation of the present materials can be cationic. Such cationic surfactants include, but are not limited to, pyridinium-containing compounds, and primary, secondary tertiary or quaternary organic amines. For a cationic surfactant, the counter ion can be, for example, chloride, bromide, methosulfate, ethosulfate, lactate, saccharinate, acetate and phosphate. Examples of cationic amines include polyethoxylated oleyl/stearyl amine, ethoxylated tallow amine, cocoalkylamine, oleylamine and tallow alkyl amine, as well as mixtures thereof.

Examples of quaternary amines with a single long alkyl group are cetyltrimethyl ammonium bromide (CTAB), benzyldodecyldimethylammonium bromide (BddaBr), benzyldimethylhexadecylammonium chloride (BdhaCl), dodecyltrimethylammonium bromide, myristyl trimethyl ammonium bromide, stearyl dimethyl benzyl ammonium chloride, oleyl dimethyl benzyl ammonium chloride, lauryl trimethyl ammonium methosulfate (also known as cocotrimonium methosulfate), cetyl-dimethyl hydroxyethyl ammonium dihydrogen phosphate, bassuamidopropylkonium chloride, cocotrimonium chloride, distearyldimonium chloride, wheat germ-amidopropalkonium chloride, stearyl octyidimonium methosulfate, isostearaminopropal-konium chloride, dihydroxypropyl PEG-5 linoleammonium chloride, PEG-2 stearmonium chloride, behentrimonium chloride, dicetyl dimonium chloride, tallow trimonium chloride and behenamidopropyl ethyl dimonium ethosulfate.

Examples of quaternary amines with two long alkyl groups are didodecyldimethylammonium bromide (DDAB), distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, and hydroxypropyl bisstearyldimonium chloride.

Quaternary ammonium compounds of imidazoline derivatives include, for example, isostearyl benzylimidonium chloride, cocoyl benzyl hydroxyethyl imidazolinium chloride, cocoyl hydroxyethylimidazolinium PG-chloride phosphate, and stearyl hydroxyethylimidonium chloride. Other heterocyclic quaternary ammonium compounds, such as dodecylpyridinium chloride, amprolium hydrochloride (AH), and benzethonium hydrochloride (BH) can also be used.

A surfactant used in preparation of the present materials can be nonionic, including, but not limited to, polyalkylene oxide carboxylic acid esters, fatty acid esters, fatty alcohols, ethoxylated fatty alcohols, poloxamers, alkanolamides, alkoxylated alkanolamides, polyethylene glycol monoalkyl ether, and alkyl polysaccharides. Polyalkylene oxide carboxylic acid esters have one or two carboxylic ester moieties each with about 8 to 20 carbons and a polyalkylene oxide moiety containing about 5 to 200 alkylene oxide units. An ethoxylated fatty alcohol contains an ethylene oxide moiety containing about 5 to 150 ethylene oxide units and a fatty alcohol moiety with about 6 to about 30 carbons. The fatty alcohol moiety can be cyclic, straight, or branched, and saturated or unsaturated. Some examples of ethoxylated fatty alcohols include ethylene glycol ethers of oleth alcohol, steareth alcohol, lauryl alcohol and isocetyl alcohol. Poloxamers are ethylene oxide and propylene oxide block copolymers, having from about 15 to about 100 moles of ethylene oxide. Alkyl polysaccharide ("APS") surfactants (for example, alkyl polyglycosides) contain a hydrophobic group with about 6 to about 30 carbons and a polysaccharide (for example, polyglycoside) as the hydrophilic group. An example of commercial nonionic surfactant is FOA-5 (Octel Starreon LLC., Littleton, Colo.).

Specific examples of suitable nonionic surfactants include alkanolamides such as cocamide diethanolamide ("DEA"), cocamide monoethanolamide ("MEA"), cocamide monoisopropanolamide ("MIPA"), PEG-5 cocamide MEA, lauramide DEA, and lauramide MEA; alkyl amine oxides such as lauramine oxide, cocamine oxide, cocamidopropylamine oxide, and lauramidopropylamine oxide; sorbitan laurate, sorbitan distearate, fatty acids or fatty acid esters such as lauric acid, isostearic acid, and PEG-150 distearate; fatty alcohols or ethoxylated fatty alcohols such as lauryl alcohol, alkylpolyglucosides such as decyl glucoside, lauryl glucoside, and coco glucoside.

A surfactant used in preparation of the present materials can be zwitterionic, having both a formal positive and negative charge on the same molecule. The positive charge group can be quaternary ammonium, phosphonium, or sulfonium, whereas the negative charge group can be carboxylate, sulfonate, sulfate, phosphate or phosphonate. Similar to other classes of surfactants, the hydrophobic moiety can contain one or more long, straight, cyclic, or branched, aliphatic chains of about 8 to 18 carbon atoms. Specific examples of zwitterionic surfactants include alkyl betaines such as cocodimethyl carboxymethyl betaine, lauryl dimethyl carboxymethyl betaine, lauryl dimethyl alpha-carboxyethyl betaine, cetyl dimethyl carboxymethyl betaine, lauryl bis-(2-hydroxyethyl)carboxy methyl betaine, stearyl bis-(2-hydroxypropyl)carboxymethyl betaine, oleyl dimethyl gamma-carboxypropyl betaine, and lauryl bis-(2-hydroxypropyl)alphacarboxy-ethyl betaine, amidopropyl betaines; and alkyl sultaines such as cocodimethyl sulfopropyl betaine, stearyidimethyl sulfopropyl betaine, lauryl dimethyl sulfoethyl betaine, lauryl bis-(2-hydroxyethyl)sulfopropyl betaine, and alkylamidopropylhydroxy sultaines.

A surfactant used in preparation of the present materials can be amphoteric. Examples of suitable amphoteric surfactants include ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates. Specific examples are cocoamphoacetate, cocoamphopropionate, cocoamphodiacetate, lauroamphoacetate, lauroamphodiacetate, lauroamphodipropionate, lauroamphodiacetate, cocoamphopropyl sulfonate, caproamphodiacetate, caproamphoacetate, caproamphodipropionate, and stearoamphoacetate.

A surfactant used in preparation of the present materials can also be a polymer such as N-substituted polyisobutenyl succinimides and succinates, alkyl methacrylate vinyl pyrrolidinone copolymers, alkyl methacrylate-dialkylaminoethyl methacrylate copolymers, alkylmethacrylate polyethylene glycol methacrylate copolymers, polystearamides, and polyethylenimine.

A surfactant used in preparation of the present materials can be an oil-based dispersant, which includes alkylsuccinimide, succinate esters, high molecular weight amines, and Mannich base and phosphoric acid derivatives. Some specific examples are polyisobutenyl succinimide-polyethylenepolyamine, polyisobutenyl succinic ester, polyisobutenyl hydroxybenzyl-polyethylenepolyamine, and bis-hydroxypropyl phosphorate.

The surfactant used in preparation of the present materials can be a combination of two or more surfactants of the same or different types selected from the group consisting of anionic, cationic, nonionic, zwitterionic, amphoteric and ampholytic surfactants. Suitable examples of a combination of two or more surfactants of the same type include, but are not limited to, a mixture of two anionic surfactants, a mixture of three anionic surfactants, a mixture of four anionic surfactants, a mixture of two cationic surfactants, a mixture of three cationic surfactants, a mixture of four cationic surfactants, a mixture of two nonionic surfactants, a mixture of three nonionic surfactants, a mixture of four nonionic surfactants, a mixture of two zwitterionic surfactants, a mixture of three zwitterionic surfactants, a mixture of four zwitterionic surfactants, a mixture of two amphoteric surfactants, a mixture of three amphoteric surfactants, a mixture of four amphoteric surfactants, a mixture of two ampholytic surfactants, a mixture of three ampholytic surfactants, and a mixture of four ampholytic surfactants.

In the present electrode compositions and methods for their preparation, the surfactant is added to the compositions as a weight percentage of the composition. In one embodiment the surfactant is present in an amount between about 0.01 wt. % and 10 wt. % of the final composition. In another embodiment the surfactant is present in an amount between about 0.1 wt. % and 5 wt. % of the final composition. In yet another embodiment the surfactant is added in an amount between about 0.5 wt. % and 3 wt. % of the final composition.

Binders

The present electrode compositions can include one or more binders suitable for incorporation in an electrode to allow or facilitate forming them into films and/or membranes which may be either free-standing or deposited on a current collector such as copper foil; in the latter case the binders preferably provide some significant adhesion to the current collector. A membrane provides selective barrier properties or selective transport properties, whereas a film is simply a thin, continuous substrate that may or may not be porous and/or flexible. The present electrode compositions can be prepared as films or membranes as they are designed to facilitate uptake of electrolyte. Preferably, the binder is electrochemically stable and facilitates the transport of ions.

The binders can be electrically conductive or electrically non-conductive. Examples include, but are not limited to, polyvinylidene fluoride (PVDF), polyacrylic acid (PAA), carboxy methyl cellulose (CMC), polyalginate, polyvinyl alcohol (PVA), polyfluorenes, perfluorosulfonic acid polymers, polyethylenimines, poly(acrylonitrile-co-acrylamide), polystyrenebutadiene rubber and poly-1,3-butadiene, and combinations thereof.

In some embodiments of the present electrode compositions, the binder makes up between about 0.1 wt. % and 40 wt. % of the final electrode composition. In some embodiments of the present electrode compositions, the binders makes up between about 0.5 wt. % and 30 wt. % of the final electrode composition. In yet another embodiment the binder makes up between about 1 wt. % and 25 wt. % of the final electrode composition.

Optional Ingredients

The present electrode compositions can also contain one or more other optional ingredients (in addition to the carbon nanoparticle/metal- or metalloid-based particle mixture and surfactant and an optional binder) to provide other desired chemical and physical properties and characteristics. In addition to the optional components discussed separately below, many other known types of optional ingredients such as dyes and air release agents, can also be included in the present compositions. In general, optional ingredients are employed in the compositions in minor amounts sufficient to enhance the performance characteristics and properties of the composition. The amounts will thus vary in accordance with the intended use and properties of the composition. In some cases the ingredient may be included in the formulation but is essentially washed out in the fabrication process with little or none remaining in the final composition.

Suitable optional ingredients include, but are not limited to, adhesion promoters, antioxidants, buffering agents, corrosion inhibitors, dyes, pigments, electrolytes, fluids, friction modifiers, electrolytes, conductive aids, host materials, scale inhibitors, seal-swelling agents, solvents, stabilizers, and thickening agents.

Adhesion and Hardening Promoters

The present compositions can include one or more adhesion and hardening promoters. Adhesion and hardening promoters increase hardness and adhesion to substrates, such as glasses, metals, silicon wafers, amorphous silicons, and plastics. Examples of adhesion promoters include metal complexes of Pd, Mg, W, Ni, Cr, Bi, B, Sn, In, and Pt.

Antioxidants

The present compositions can include one or more antioxidants. Examples of antioxidants include phenolic antioxidants, aromatic amine antioxidants, sulfurized phenolic antioxidants, and organic phosphates. Examples include 2,6-di-tert-butylphenol, liquid mixtures of tertiary butylated phenols, 2,6-di-tertbutyl-4-methylphenol, 4, 4'-methylenebis(2,6-di-tert-butyl phenol), 2,2'-methylenebis(4-methyl-6-tert-butylphenol), mixed methylene-bridged polyalkyl phenols, 4,4'-thiobis(2-methyl-6-tert-butylphenol), N,N'-di-sec-butyl-p-phenylenediamine, 4-isopropylaminodiphenylamine, phenyl-alphanaphthylamine, and phenyl-beta-naphthylamine.

Buffering Agents

The present compositions can include one or more buffering agents. The buffering agents can be selected from known or commonly used buffering agents. Selected buffering agents can exhibit both anti-corrosion and buffering properties. Certain formulations such as benzoates, borates, and phosphates can provide both buffering and anticorrosion advantages. In addition, a base can be used to adjust the pH value of the composition. Illustrative examples of bases include commonly known and used bases, for example, inorganic bases such as KOH, NaOH, NaHCO$_3$, K$_2$CO$_3$, and Na$_2$CO$_3$. In addition, an acid can be used to adjust the pH value of the composition. Illustrative examples of acids that can be used include commonly known and used acids, for example, organic acids including, but not limited to, α-hydroxy acids, such as malic acid, citric acid, lactic acid, glycolic acid, and mixtures thereof, and inorganic acids, including but not limited to mineral acids such as boric acid, hydrobromic acid, hydrochloric acid, hydrofluoric acid, nitric acid, perchloric acid, phosphoric acid, and sulfuric acid. In some embodiments the pH will be between about 4 and about 11, preferably between about 5 and about 10. In other embodiments the pH will between about 5 and about 7 or between about 7 and about 10. The pH values recited above are for the composition during preparation.

Corrosion Inhibitors

The present compositions can include one or more corrosion inhibitors that can be either organic or inorganic additives. Examples of organic corrosion inhibitors include short aliphatic dicarboxylic acids such as maleic acid; succinic acid, and adipic acid; triazoles such as benzotriazole and tolytriazole; thiazoles such as mercaptobenzothiazole; thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis)hydrocarbyldithio)-1,3,4-thiadiazoles; sulfonates; and imidazolines. Further examples of organic corrosion inhibitors include dimer and trimer acids, such as those produced from tall oil fatty acids, oleic acid, or linoleic acid; alkenyl succinic acid and alkenyl succinic anhydride corrosion inhibitors, such as tetrapropenylsuccinic acid, tetrapropenylsuccinic anhydride, tetradecenylsuccinic acid, tetradecenylsuccinic anhydride, hexadecenylsuccinic acid, hexadecenylsuccinic anhydride; and the half esters of alkenyl succinic acids having 8 to 24 carbon atoms in the alkenyl group with alcohols such as the polyglycols. Other corrosion inhibitors include ether amines; acid phosphates; amines; polyethoxylated compounds such as ethoxylated amines, ethoxylated phenols, and ethoxylated alcohols; imidazolines; aminosuccinic acids or derivatives thereof. Inorganic additives include borates, phosphates, silicates, nitrates, nitrites, and molybdates.

Copper Corrosion Inhibitors

Examples of copper corrosion inhibitors that can be included in the present compositions include thiazoles such as 2-mercapto benzothiazole; triazoles such as benzotriazole, tolyltriazole, octyltriazole, decyltriazole, and dodecyltriazole; and thiadiazoles such as 2-mercapto-5-hydrocarbylthio-1,3,4-thiadiazoles, 2-mercapto-5-hydrocarbyldithio-1,3,4-thiadiazoles, 2,5-bis(hydrocarbylthio)-1,3,4-thiadiazoles, and 2,5-(bis(hydrocarbyldithio)-1,3,4-thiadiazoles.

Diluents

The present compositions can include one or more diluents. Exemplary diluents include, mono- and di-glycidyl ethers, glycol ether, glycol ether esters and glycol ether ketones, and combinations thereof. Diluents are not limited to these agents and suitable diluents can be selected based on the desired properties of the composition.

Electrolytes

Some embodiments can include electrolytes. Electrolytes are particularly suitable when making a battery. Commercial or currently used electrolytes are suitable for use with the electrodes. In an embodiment, the electrolyte can further comprise conductive aids.

Fluids

Embodiments can include a fluid, which can be either hydrophilic or hydrophobic. The fluid can be a conventional fluid used in polymer and thermal transfer applications.

The fluid can be a single component or multi-component mixture. For example, a hydrophilic fluid can contain water, ethylene glycol, and diethylene glycol in various proportions. The hydrophilic fluid can contain about 0.1 to about 99.9% by volume of water, about 0.1 to about 99.9% by volume of ethylene glycol, and about 0.1 to about 99.9% by volume of diethylene glycol; and about 20 to about 80%, about 40 to about 60%, or about 50% by volume of water or ethylene glycol. Typically, diethylene glycol constitutes a minor component of the hydrophilic fluid, in no greater than about 20%, no greater than about 10%, or no greater than about 5% of the total volume.

Dipole moments, also known as electrical dipole moments, refer to a measure of the separation of positive and negative electrical charges in a system of charges, that is, a measure of the charge system's overall polarity. It was found that fluids having higher dipole moments result in more rapid alignment of the nanoparticles. Therefore, in one embodiment fluids with a dipole moment at least or greater than about zero (0), at least or greater than about one (1), greater than or about two (2), greater than or about three (3) are used. Examples of fluids and their corresponding dipole moments include, hexane (with a dipole moment of zero (0)), water (with a dipole moment of 1.85), and dimethylformamide (DMF) (with a dipole moment of 3.82).

Hydrophilic Fluid

Hydrophilic fluids include hydrophilic liquid that are miscible with water, non-limiting examples include, but are not limited to, water, aliphatic alcohols, alkylene glycols, di(alkylene) glycols, monoalkyl ethers of alkylene glycols or di(alkylene) glycols, and various mixtures thereof. Suitable aliphatic alcohols contain no greater than 6 carbons and no greater than 4 hydroxyls, such as methanol, ethanol, isopropanol, and glycerol.

Suitable alkylene glycols contain no greater than 5 carbons, such as ethylene glycol, propylene glycol, and 1,2-butylene glycol. In a particular embodiment, the hydrophilic fluid comprises ethylene glycol, propylene glycol, and mixtures thereof. Ethylene glycol and propylene glycol are excellent antifreeze agents and also markedly reduce the freezing point of water. Suitable di(alkylene) glycols contain no greater than 10 carbons, such as diethylene glycol, triethylene glycol, tetraethylene glycol, and dipropylene glycol.

As used herein, the term "alkylene glycol" refers to a molecule having glycol functional moiety in its structure in general, including alkylene glycol, alkylene glycols, di(alkylene) glycols, tri(alkylene) glycols, tetra(alkylene) glycols, and their various derivatives, such as ethers and carboxylic esters.

Hydrophobic Fluid

Hydrophobic fluids can be selected from a wide variety of well-known organic oils (also known as base oils), including petroleum distillates, synthetic petroleum oils, greases, gels, oil-soluble polymer composition, vegetable oils, and combinations thereof. Petroleum distillates, also known as mineral oils, generally include paraffins, naphthenes and aromatics.

Synthetic petroleum oils are the major class of lubricants widely used in various industries. Some examples include alkylaryls such as dodecylbenzenes, tetradecylbenzenes, dinonylbenzenes, and di-(2-ethylhexyl)benzenes; polyphenyls such as biphenyls, terphenyls, and alkylated polyphenyls; fluorocarbons such as polychlorotrifluoroethylenes and copolymers of perfluoroethylene and perfluoropropylene; polymerized olefins such as polybutylenes, polypropylenes, propylene-isobutylene copolymers, chlorinated polybutylenes, poly(1-octenes), and poly(1-decenes); organic phosphates such as triaryl or trialkyl phosphates, tricresyl phosphate, trioctyl phosphate, and diethyl ester of decylphosphonic acid; and silicates such as tetra(2-ethylhexyl)silicate, tetra(2-ethylbutyl)silicate, and hexa(2-ethylbutoxy)disiloxane. Other examples include polyol esters, polyglycols, polyphenyl ethers, polymeric tetrahydrofurans, and silicones.

In one embodiment, the hydrophobic fluid is a diester which is formed through the condensation of a dicarboxylic acid, such as adipic acid, azelaic acid, fumaric acid, maleic acid, phtalic acid, sebacic acid, suberic acid, and succinic acid, with a variety of alcohols with both straight, cyclic, and branched chains, such as butyl alcohol, dodecyl alcohol, ethylene glycol diethylene glycol monoether, 2-ethylhexyl alcohol, isodecyl alcohol, hexyl alcohol, pentaeryteritol, propylene glycol, tridecyl alcohol, and trimethylolpropane. Modified dicarboxylic acids, such as alkenyl malonic acids, alkyl succinic acids, and alkenyl succinic acids, can also be used. Specific examples of these esters include dibutyl adipate, diisodecyl azelate, diisooctyl azelate, dihexyl fumarate, dioctyl phthalate, didecyl phthalate, di(2-ethylhexyl)sebacate, dioctyl sebacate, dicicosyl sebacate, and the 2-ethylhexyl diester oflinoleic acid dimer, the complex ester formed by reacting one mole of sebacic acid with two moles of tetraethylene glycol and two moles of 2-ethylhexanoic acid.

In another embodiment, the hydrophobic fluid is a polyalphaolefin which is formed through oligomerization of 1-olefines containing 2 to 32 carbon atoms, or mixtures of such olefins. Some common alphaolefins are 1-octene, 1-decene, and 1-dodecene. Examples of polyalphaolefins include poly-1-octene, poly-1-decene, poly-1-dodecene, mixtures thereof, and mixed olefin-derived polyolefins. Polyalphaolefins are commercially available from various sources, including DURASYN® 162, 164, 166, 168, and 174 (BP-Amoco Chemicals, Naperville, Ill.), which have viscosities of 6, 18, 32, 45, and 460 centistokes, respectively.

In yet another embodiment, the hydrophobic fluid is a polyol ester which is formed through the condensation of a monocarboxylic acid containing 5 to 12 carbons and a polyol and a polyol ether such as neopentyl glycol, trimethylolpropane, pentaerythritol, dipentaerythritol, and tripentaerythritol. Examples of commercially available polyol esters are ROYCO® 500, ROYCO® 555, and ROYCO® 808. ROYCO® 500 contains about 95% of pentaerythritol esters of saturated straight fatty acids with 5 to 10 carbons, about 2% of tricresyl phosphate, about 2% of N-phenylalphanaphthylamine, and about 1% of other minor additives. ROYCO® 808 contains about 30 to 40% by weight of trimethylolpropane esters of heptanoic, caprylic and capric acids, 20 to 40% by weight of trimethylolpropane esters of valeric and heptanoic acids, about 30 to 40% by weight of neopentyl glycol esters of fatty acids, and other minor additives.

Generally, polyol esters have good oxidation and hydrolytic stability. The polyol ester for use herein preferably has a pour point of about −100° C. or lower to −40° C. and a viscosity of about 2 to 100 centistoke at 100° C.

In yet another embodiment, the hydrophobic fluid is a polyglycol which is an alkylene oxide polymer or copolymer. The terminal hydroxyl groups of a polyglycol can be further modified by esterification or etherification to generate another class of known synthetic oils. Interestingly, mixtures of propylene and ethylene oxides in the polymerization process will produce a water soluble lubricant oil. Liquid or oil type polyglycols have lower viscosities and molecular weights of about 400, whereas 3,000 molecular weight polyglycols are viscous polymers at room temperature.

In yet another embodiment, the hydrophobic fluid is a combination of two or more selected from the group consisting of petroleum distillates, synthetic petroleum oils, greases, gels, oil-soluble polymer composition and vegetable oils. Suitable examples include, but not limited to, a mixture of two polyalphaolefins, a mixture of two polyol esters, a mixture of one polyalphaolefine and one polyol ester, a mixture of three polyalphaolefins, a mixture of two polyalphaolefins and one polyol ester, a mixture of one polyalphaolefin and two polyol esters, and a mixture of three polyol esters. In the embodiments, the thermal transfer fluid can have has a viscosity of about 1 to about 1,000 centistokes, more preferably from about 2 to about 800 centistokes, and most preferably from about 5 to about 500 centistokes.

In yet another embodiment, the hydrophobic fluid is grease which is made by combining a petroleum or synthetic lubricating fluid with a thickening agent. The thickeners are generally silica gel and fatty acid soaps of lithium, calcium, strontium, sodium, aluminum, and barium. The grease formulation can also include coated clays, such as bentonite and hectorite clays coated with quaternary ammonium compounds. Sometimes carbon black is added as a thickener to enhance high-temperature properties of petroleum and synthetic lubricant greases. The addition of organic pigments and powders which include arylurea compounds indanthrene, ureides, and phthalocyanines provide high temperature stability. Sometimes, solid powders such as graphite, molybdenum disulfide, asbestos, talc, and zinc oxide are also added to provide boundary lubrication. Formulating the foregoing synthetic lubricant oils with thickeners provides specialty greases. The synthetic lubricant oils include, without limitation, diesters, polyalphaolefins, polyol esters, polyglycols, silicone-diester, and silicone lubricants. In some embodiments nonmelting thickeners are preferred such as copper phthalocyanine, arylureas, indanthrene, and organic surfactant coated clays.

Friction Modifiers

Suitable friction modifiers include aliphatic amines, aliphatic fatty acid amides, aliphatic carboxylic acids, aliphatic carboxylic esters, aliphatic carboxylic esteramides, aliphatic phosphonates, aliphatic phosphates, aliphatic thiophosphonates, and aliphatic thiophosphates, wherein the aliphatic group usually contains above about eight carbon atoms so as to render the compound suitably oil soluble. Also suitable are aliphatic substituted succinimides formed by reacting one or more aliphatic succinic acids or anhydrides with ammonia.

Scale Inhibitors

Certain embodiments can include scale inhibitors. Suitable scale inhibitors include components such as phosphate esters, phosphino carboxylate, polyacrylates, polymethacylate, styrene-maleic anhydride, sulfonates, maleic anhydride co-polymer, and acrylate-sulfonate co-polymer. The basic composition can be tailored for selective applications. For example, nitrates and silicates provide aluminum protection. Borates and nitrites can be added for ferrous metal protection, and benzotriazole and tolytriazole can be added for copper and brass protection.

Thickening Agent

Certain embodiments can include thickening agents. Examples of thickening agents can include, but are not limited to silica gel and fatty acid soaps of lithium, calcium, strontium, sodium, aluminum, and barium.

Conductive Aids

Additional agents to further enhance electrical conductivity may be included in the formulation and may be introduced, for example, with the binder. These conductive aids may include, but are not limited to, acetylene carbon black particles, porous carbon, graphite particles, and/or single layer or multilayer graphene particles/platelets.

EXEMPLARY EMBODIMENTS

Exemplary ranges for components of the present electrode compositions are shown in Table 1. All ingredients are described in weight percent of the total material composition.

TABLE 1

| Ingredient | A | B | C |
|---|---|---|---|
| Binder | 0.1-40 wt. % | 0.5-30 wt. % | 1-25 wt. % |
| Metal Oxide Particles, Metal Particles, Metalloid Particles, and/or Metalloid Oxide Particles | 5-95 wt. % | 10-90 wt. % | 15-85 wt. % |
| Carbon Nanoparticles | 5-95 wt. % | 10-75 wt. % | 15-50 wt. % |
| Surfactant | 0.01-10 wt. % | 0.1-5 wt. % | 0.5-3 wt. % |

In one embodiment, a surfactant combined with a method of physical agitation, such as ultrasonication, can be used to aid the homogeneous dispersion and integration of carbon nanoparticles with metals, metal oxides, metalloids or metalloid oxides. After the surfactant has been adsorbed on the nanoparticles' surface, ultrasonication can debundle the nanoparticles by steric or electrostatic repulsions.

It has been discovered that the ratio of the nanoparticles to the surfactant that it used can be important in influencing the properties of the material. As such, the nanoparticles and surfactant can be in a ratio of from about 100:1 to about 1:20, preferably from about 1:3 to about 1:15, more preferably from about 1:5 to about 1:12 by weight. In some embodiments the ratio of nanoparticles to surfactant is between about 1:7 and about 1:10 by weight. The ratios referred to above are for the mixture as it is being mixed. The ranges for the ratios recited are inclusive of the numbers defining the range and include each integer and fractions within the defined range of ratios.

In one embodiment, the present electrode compositions exhibit improved electrical properties relative to carbon nanoparticles. For example, the active materials in the electrode compositions (metal particles, metal oxide particles, metalloid particles, and/or metalloid oxide particles in combination with carbon nanoparticle materials) can have a specific capacity (often expressed as milliamp-hours per weight such as per gram, abbreviated as mAh/g) improvement over the carbon nanoparticles and over graphite of at least 5%. The capacitance will be limited by the capacitance of the metal, metal oxide, metalloid or metalloid oxide; however, capacitance can be affected by the selection of particular metals and/or metal oxides. In one embodiment, the present electrode compositions have a specific capacity of at least 450 mAh/g, preferably at least 500 mAh/g, and more preferably at least 600 mAh/g of active material when cycled at a charge/discharge rate of about 0.1C (10 hour charge and 10 hour discharge rate).

In one embodiment, the present electrode compositions have improved electrical properties relative to metal oxide nanoparticles, metalloid nanoparticles or metal nanoparticles. For further example, certain embodiments are expected to have improved electrical conductivity relative to metal oxide nanoparticles and metalloid nanoparticles of about at least 1 order of magnitude.

The present compositions can be prepared in many diverse forms, with many different properties, and for many intended applications. For example, some of the present compositions can form electrodes with improved charge/discharge capacity, conductivity, improved number of cycle lifetimes, rechargeability, and reversibility.

In some embodiments the compositions can form an anode. Preferred metal particles, metal oxide particles, metalloid particles, and/or metalloid oxide particles for anodes include $Al_2O_3$, CuO, MgO, $SiO_2$, $GeO_2$, $B_2O_3$, $TeO_2$, $V_2O_5$, $BiO_2$, $Sb_2O_5$, $TiO_2$, ZnO, FeO, $Fe_2O_3$, $Fe_3O_4$, $CrO_3$, NiO, $Ni_2O_3$, COO, $Co_2O_3$, and $Co_3O_4$.

In some embodiments the compositions can form a cathode. Preferred metal particles, metal oxide particles, metalloid particles, and/or metalloid oxide particles for cathodes include $LiFePO_4$, $LiCoO_2$, $LiMn_2O_4$, and $LiNi_{1/3}Mn_{1/3}Co_{1/3}O_2$, $LiNiO_2$, $LiNi_{0.8}Co_{0.15}Al_{0.05}O_2$, $LiMn_{3/2}Ni_{1/2}O_4$, $LiFe_{1/2}Mn_{1/2}PO_4$, $Li_4Ti_5O_{12}$.

In some embodiments of the present methods for making the electrode compositions, particular dispersion techniques are employed to provide homogenously mixed carbon nanoparticles (for example, graphene, nanotubes, carbon nanofiber) and metal oxides and/or metal particles. It has been discovered that using a surfactant can cause metal oxides and/or metal particles to attach to carbon nanoparticles more uniformly. It is believed that metal oxide particles, metal and/or metalloid particles collect on the surface of carbon nanoparticles by electrostatic attraction (for example, metal oxides have positive zeta potential charge at proper pH and carbon nanotubes have negative charge due to surfactant which may attach to the carbon surface via the hydrophobic head) and form a well dispersed deposition of metal particles, metal oxide particles, metalloid particles, and/or metalloid oxide particles integrated to the carbon nanomaterials.

FIGS. 1-6 provide illustrative images showing example metal oxide particles, metal and/or metalloid particles collected and attached to a variety of example nanofibers, nanotubes, and/or other nanoparticles.

FIG. 1 is a scanning electron microscope (SEM) image (magnification 29,380) of iron oxide ($Fe_2O_3$) nanoparticles substantially uniformly attached to carbon nanofibers (surfactant: sodium dodecylbenzene sulfonate). It can be seen that the $Fe_2O_3$ nanoparticles (black dots) are spatially distributed on the surface of the nanofibers in a substantially non-aggregated arrangement with few or no instances of $Fe_2O_3$ nanoparticles stacked on top of each other.

Figure 2:
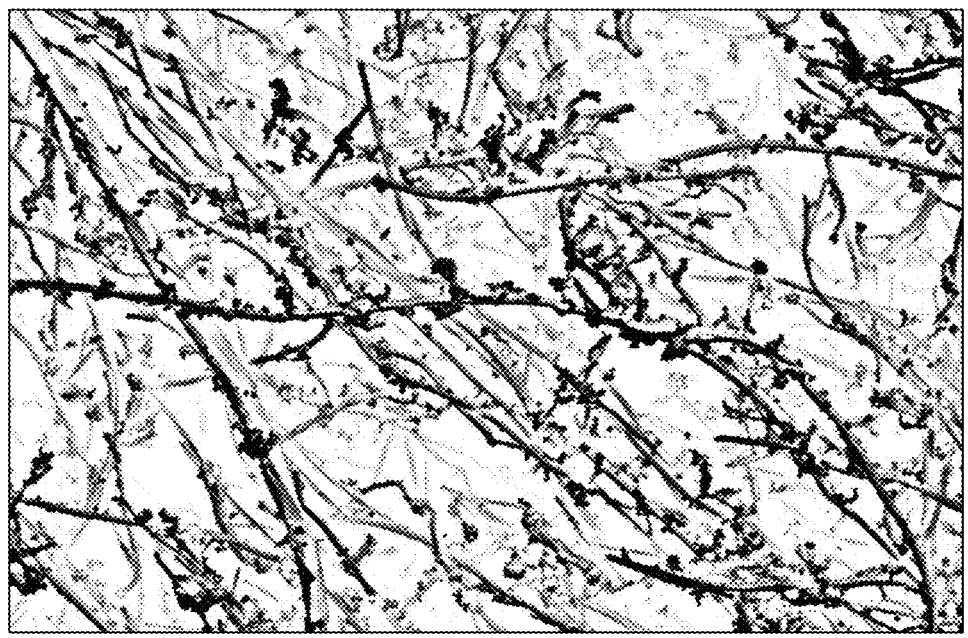
FIG. 2 shows an SEM image of silicon (Si) nanoparticles dispersed and attached on the carbon nanofibers without substantial aggregation. The surfactant used was cetyltrimethylammonium bromide.

FIG. 2 is an SEM image (magnification 16,810) of silicon (Si) nanoparticles attached to carbon nanofibers (surfactant: cetyltrimethylammonium bromide). It can be seen that the Si nanoparticles (black dots) are spatially distributed on the surface of the nanofibers in a substantially non-aggregated arrangement with few or no instances of Si nanoparticles stacked on top of each other.

Figure 3:
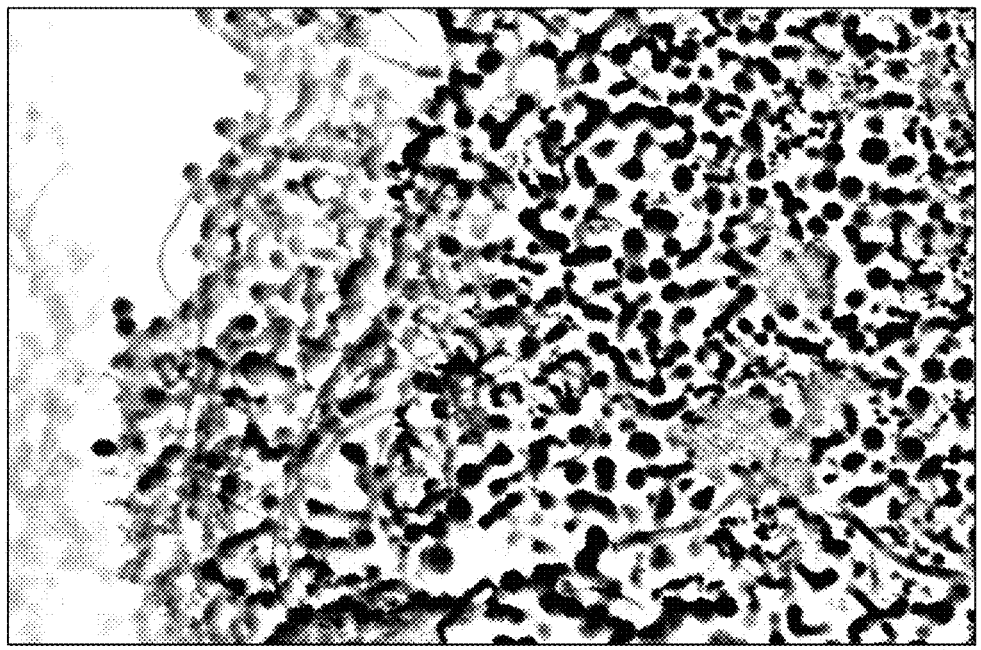
FIG. 3 shows an SEM image of silicon (Si) nanoparticles dispersed and attached on the single wall carbon nanotubes (C-SWNT) without substantial aggregation. The surfactant used was cetyltrimethylammonium bromide.

FIG. 3 is an SEM image (magnification 62,270) of silicon (Si) nanoparticles attached to single wall carbon nanotubes (C-SWNT) (surfactant: cetyltrimethylammonium bromide). It can be seen that the Si nanoparticles (black dots) are spatially distributed on the surface of the C-SWNTs in a substantially non-aggregated arrangement with few or no instances of Si nanoparticles stacked on top of each other.

Figure 4:
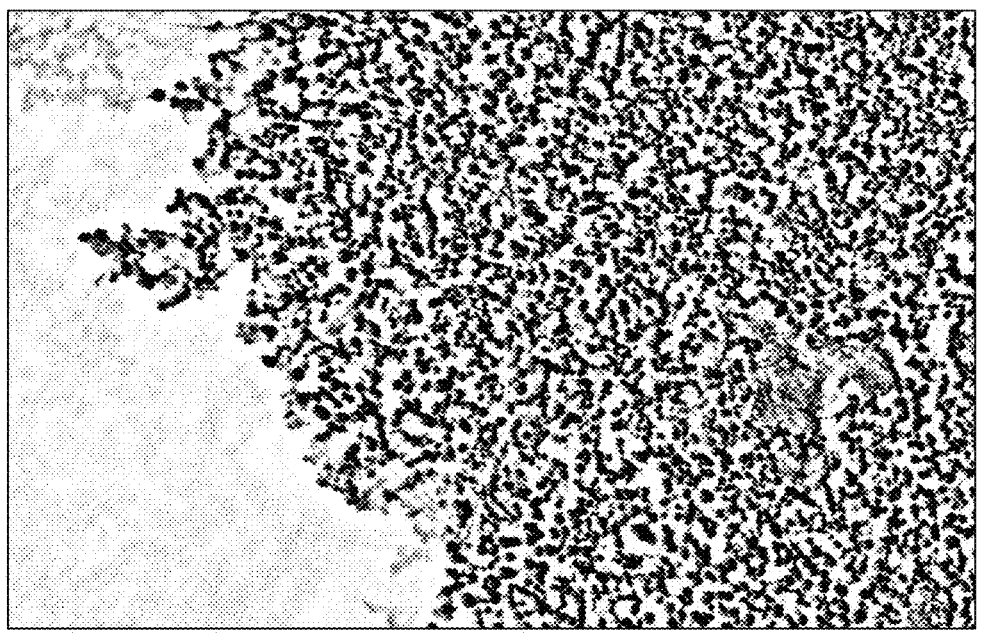
FIG. 4 shows an SEM image of silicon (Si) nanoparticles dispersed and attached on the single wall carbon nanotubes (C-SWNT) without substantial aggregation. The surfactant used was benzethonium chloride.

FIG. 4 is an SEM image (magnification 35,120) of silicon (Si) nanoparticles attached to single wall carbon nanotubes (C-SWNT) (surfactant: benzethonium chloride). It can be seen that the Si nanoparticles (black dots) are spatially distributed on the surface of the C-SWNTs in a substantially non-aggregated arrangement with few or no instances of Si nanoparticles stacked on top of each other.

Figure 5:
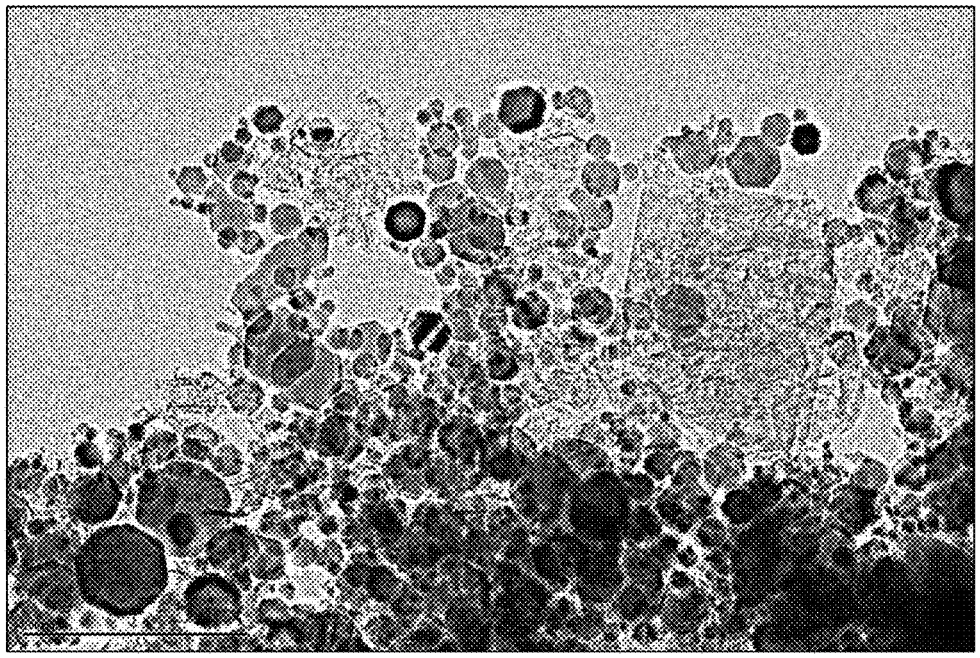
FIG. 5 shows a transmission electron microscopy (TEM) image of iron oxide ($Fe_2O_3$) nanoparticles dispersed and attached on the graphene without substantial aggregation. The surfactant used was sodium dodecylbenzenesulfonate.

FIG. 5 is a transmission electron microscope (TEM) image (the scale bar is 200 nm) of iron oxide ($Fe_2O_3$) nanoparticles attached to graphene (surfactant: sodium dodecylbenzenesulfonate). Although the transmission images include many multilayer regions (especially the lower section) which obscures analysis in these regions, the $Fe_2O_3$ nanoparticles (hexagonal shapes) appear spatially distributed on the surface of the graphene in a substantially non-aggregated arrangement.

Figure 6:
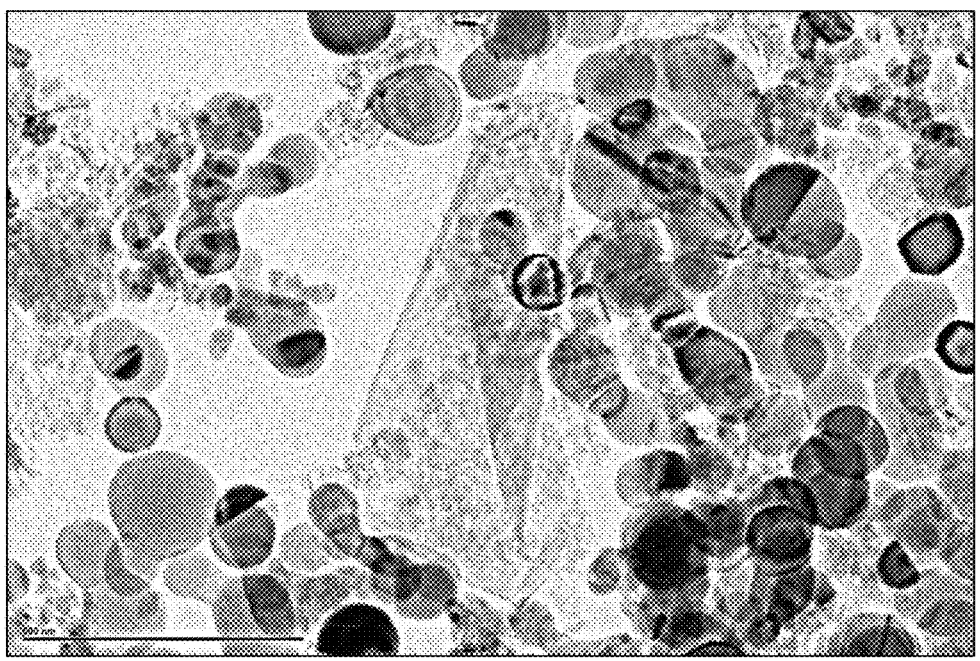
FIG. 6 shows a TEM image of silicon (Si) nanoparticles dispersed and attached on the graphene without substantial aggregation. The surfactant used was benzethonium chloride.

FIG. 6 is a transmission electron microscope (TEM) image (the scale bar is 500 nm) of silicon (Si) nanoparticles substantially uniformly attached to graphene (surfactant: benzethonium chloride). Although the transmission images include some multilayer regions which obscures analysis in these regions, the Si nanoparticles (circular shapes) appear spatially distributed on the surface of the graphene in a substantially non-aggregated arrangement.

Electrochemical Device

Figure 7:
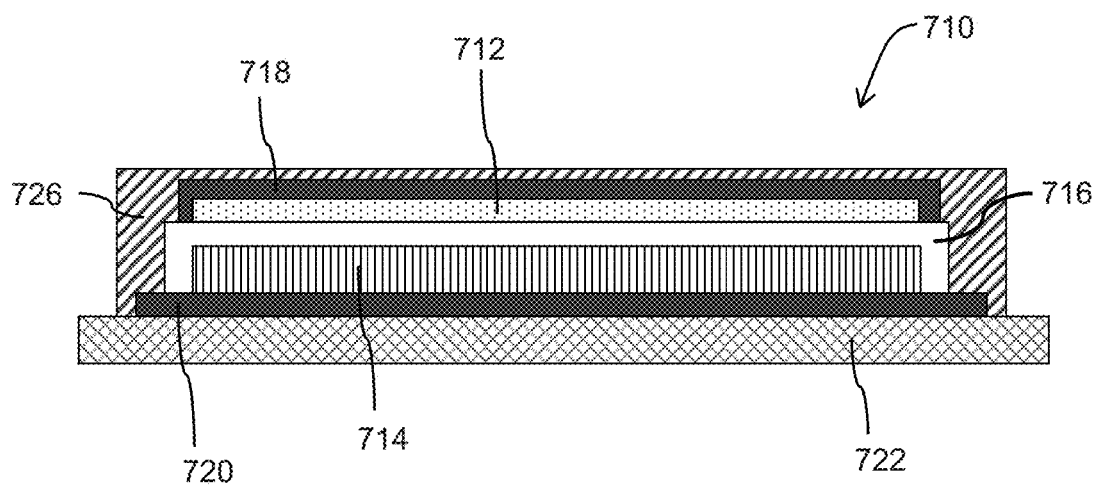
FIG. 7 is a cross-sectional diagram of a thin film lithium-ion battery wherein the anode and/or the cathode have an electrode composition as described herein.

FIG. 7 shows in cross-sectional a thin film lithium-ion battery 10. Battery 710 includes an anode 712, a cathode 714 and an electrolyte 716 interposed between anode 712 and cathode 714. Anode 712 and/or cathode 714 have an electrode composition as described herein. An anode current collector 718 is in electrical contact with anode 712. Similarly, a cathode current collector 720 is in electrical contact with cathode 714. Gas diffusion layer or substrate 722 is located adjacent cathode current collector 720. In certain examples, a separator (such as a polymer separator, nonwoven fiber separator, and/or other membrane separator) (not shown) is provided between anode 712 and cathode 714 to prevent electrical short circuits between anode 712 and cathode 714 while still allowing transport of charged ions for current flow in battery 710. Separator is chemically and electrochemically stable with respect to electrolyte 716 while allowing ions to move between anode 712 and cathode 714. Protective layer 726 joins with substrate 722 to encase the remaining components of battery 710.

Using one or more of the example electrode compositions disclosed herein to form anode 712 and/or cathode 714 provides higher capacity and higher performance in energy storage systems when compared to prior electrode compositions. Through non-aggregated integration of carbon nanoparticles (for example, graphene, nanotubes, carbon nanofiber) with metal oxide particles, metal particles, metalloid particles, and/or metalloid oxide particles, anode 712 and/or cathode 714 can be formed with desirable properties including, but not limited to, improved charge capacity, conductivity, improved number of cycle lifetimes, improved rechargeability, and/or reversibility, for example. Ion absorbing particles are integrated with magnetically aligned carbon nanoparticles to provide improved electrochemical cell functionality and operating performance while reducing heat generation and malfunction. Such combination results in improved physical properties, including, but not limited to, electrical conductivity, thermal conductivity, increased tensile modulus (stiffness), flexural modulus, tensile strength, flexural strength, elasticity, and toughness.

Battery 710 can be used to power a variety of devices including laptop computers, tablet computers, smartphones, hybrid and/or electric cars, and/or other electronic devices, for example. Battery 710 can be directly connected as a power source and/or included as part of a battery assembly, for example.

Methods of Preparing Electrodes

Electrodes can be prepared using the composite materials described herein. Various methods can be used to solidify and form the material into a desired shape. In most cases, a binder is used as a matrix for the metal/carbon nanoparticle or metal oxide/carbon nanoparticle material.

As described above, a surfactant can be used to facilitate the homogeneous dispersion of carbon nanoparticles and metal oxides and/or metal particles. Dispersion can also be aided by physical agitation, as described above. Following the dispersion of carbon nanoparticles and metal oxides and/or metal particles, excess surfactant is removed. This can be done, for example, through filtration or centrifugation. Any suitable liquid can be used to wash off excess surfactant. For example in some cases water, ethanol, or isopropyl alcohol can be used. After the excess surfactant is removed, some residual surfactant may remain. Preferably, only the surfactant that serves to attach the metal, metal oxide, metalloid or metalloid oxide particles to the carbon nanoparticles remains. A binder can then be added to the dispersed carbon nanoparticles and metal, metal oxide, metalloid or metalloid oxide to form an electrode.

Figure 9:
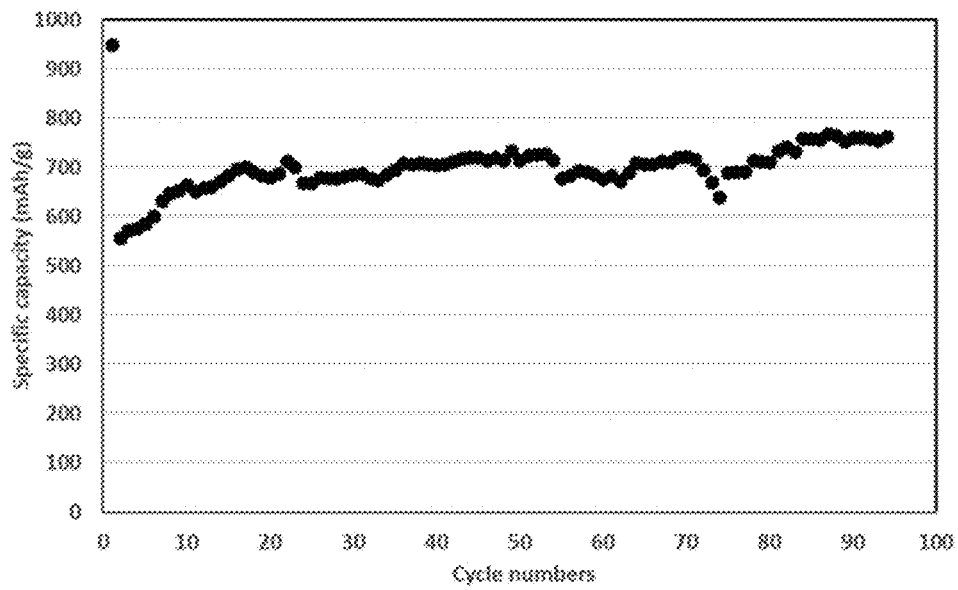
FIG. 9 is a graph showing the specific capacity measured from the discharge cycle (per unit mass of active material) over 94 (charge/discharge) cycles for an anode material in which sodium dodecylbenzenesulfonate surfactant was used in the material preparation, and which comprises $Fe_2O_3$ nanoparticles combined with graphene nanoparticles as the active materials.

FIG. 9 is a graph showing the change in charge capacity over multiple life (charge/discharge) cycles for an electrode comprising about 75 wt. % $Fe_2O_3$ nanoparticles attached to about 25 wt. % graphene Sodium dodecylbenzenesulfonate was the surfactant employed in the material preparation. The binder employed in preparing this dispersion was polyacrylic acid (PAA). This formulation demonstrates substantially better charge capacity, in the region of 700 mAh/g, when compared with electrodes made of graphite, which typically have a specific capacity around 350 mAh/g.

Figure 8:
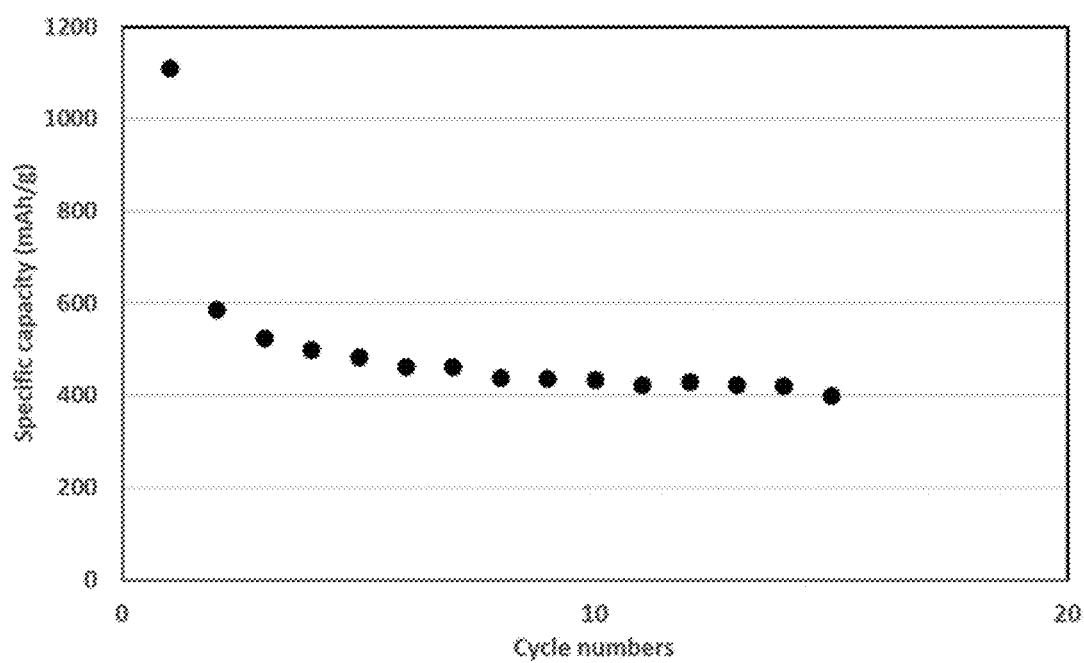
FIG. 8 is a graph showing the specific capacity measured from the discharge cycle (per unit mass of active material) over multiple (charge/discharge) cycles for an electrode in which surfactant was not included in the formulation, and which comprises $Fe_2O_3$ nanoparticles mixed with graphene nanoparticles as the active materials.

The significance of including a suitable surfactant is illustrated by comparing FIG. 9 with FIG. 8, which shows a formulation comprising 75 wt. % $Fe_2O_3$ and 25 wt. % graphene, but where no surfactant was included in the formulation. In this case, substantial capacity fade is evident in the first 3 or 4 (charge/discharge) cycles and the electrode capacity is much lower than for the electrode prepared with surfactant.

Figure 10:
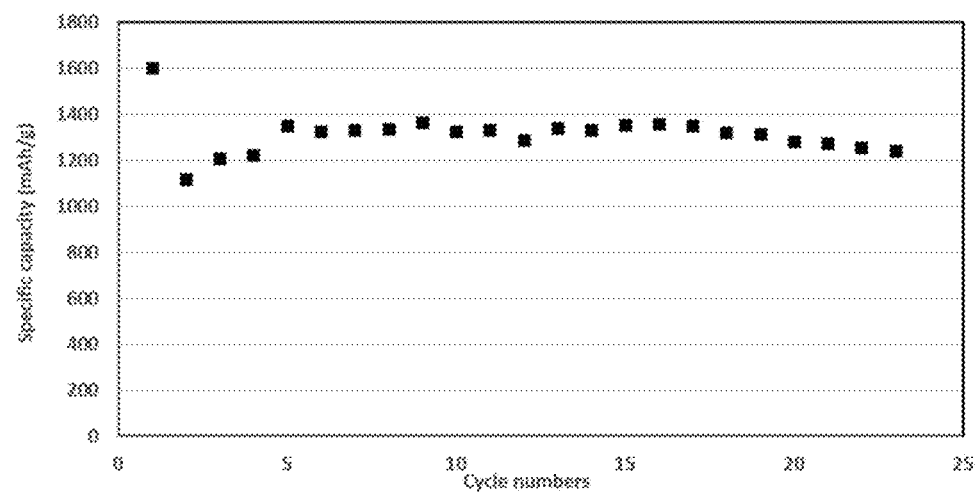
FIG. 10 is a graph showing specific capacity measured from the discharge cycle (per unit mass of active material) over 23 (charge/discharge) cycles for an anode material in which benzyldodecyldimethylammonium bromide surfactant was used in the material preparation, and which comprises silicon nanoparticles combined with carbon nanotubes as the active materials.

FIG. 10 is a graph showing the change in charge capacity over multiple life (charge/discharge) cycles for an electrode comprising about 50 wt. % silicon nanoparticles attached to about 50% wt. % graphene nanoparticles. Benzyldodecyldimethylammonium bromide surfactant was employed in preparing the electrode. The binder employed in preparing this dispersion was polyacrylic acid (PAA). Again, this formulation demonstrates substantially better charge capacity, in the region of 1200 mAh/g, when compared with electrodes made of graphite, which typically have a capacity of about 350 mAh/g.

Physical Agitation

A uniform and stable dispersion of nanoparticles plays an important role in the formation of homogeneous and integrated carbon nanoparticle/metal oxide, or carbon nanoparticle/metal nanoparticle compositions. When the carbon nanoparticles are aggregated in a composition, the poor dispersion can cause non-uniform load and weaken the conductivity and capacitance and can adversely affect other properties of the material.

The compositions can be prepared by conventional means of dispersing a mixture of the appropriate carbon nanoparticles, metal oxides and/or metal nanoparticles, surfactant(s), and/or other optional additives, including binder(s). For example, a common approach is using a physical method to form a stable suspension of nanoparticles in a fluid. A variety of physical mixing methods are suitable, including a conventional mortar and pestle mixing (for dry materials), high shear mixing, such as with a high speed mixer, a rotor-stator mixer, milling, homogenizers, microfluidizers, high impact mixing, stirring (both manually and/or with the use of a stir bar), centrifugation, and ultrasonication methods. The various physical mixing methods can be performed at room temperature, cooled temperatures, and/or heated temperatures.

One method of physical agitation is stirring, in particular with the use of a stir bar. Another method of physical agitation is ultrasonication. Ultrasonication is one of the less destructive methods to the structures of nanoparticles, in particular carbon nanotubes, if used under suitable operating conditions. Ultrasonication can be done either in the bath-type ultrasonicator, or using a tip-type ultrasonicator. Typically, tip-type ultrasonication is for applications which require higher energy output. Ultrasonication can be performed, for example, at an intermediate intensity for up to 60 minutes. Additionally, the mixture can be ultrasonicated intermittently to avoid overheating, or a chiller can be used, especially when a flow-through cell is employed. It is well known that overheating can cause covalent bond breakage in carbon nanotubes, which causes the nanotubes to lose some of its beneficial physical properties. As such, in the case of batch processing, the carbon nanoparticle-containing mixture is generally energized for a predetermined period of time with a break in between. Each energizing period is no more than about 30 minutes, no more than about 15 minutes, no more than 10 minutes, no more than 5 minutes, no more than 2 minutes, no more than 1 minute, or no more than 30 seconds. The break between energizing periods provides an opportunity for the energized carbon nanoparticles to dissipate the energy. The break is typically no less than about 1 minute, no less than about 2 minutes, no less than about 5 minutes, or between about 5 to about 10 minutes.

The raw material mixture can be pulverized by a suitable dry or wet grinding method. One grinding method includes pulverizing the raw material mixture in a liquid host material to obtain a concentrate or paste, and the pulverized product can then be dispersed further in a liquid host material with the aid of surfactants as described above. However, pulverization or milling often reduces the carbon nanoparticle average aspect ratio which can have a detrimental effect on the properties of the final material.

Individual components (for example, carbon nanoparticles, metals, metal oxides) can be separately blended into a liquid host material, or can be blended therein in various sub-combinations, if desired. Ordinarily, the particular sequence of such blending steps is not critical. Moreover, such components can be blended in the form of separate solutions in a diluent. However to simplify the blending operations, reduce the likelihood of blending errors, and take advantage of the compatibility and solubility characteristics afforded by the overall concentrate, one can blend the components used in the form of an additive concentrate.

In one embodiment, the method of physical agitation comprises, consists of, or consists essentially of stirring and/or ultrasonication. In another embodiment, the dispersing steps can comprise, consist of, or consist essentially of ultrasonication in a batch process or in a continuous flow-through ultrasonication process. In one embodiment, the duration of the ultrasonication is between about 5 seconds and about 50 minutes, preferably between about 5 minutes and about 40 minutes, more preferably between about 10 minutes and about 30 minutes, and even more preferably between about 15 minutes and about 20 minutes. The intensity of the ultrasonication is between about 5% and about 80% amplification, preferably between about 10% and about 70% amplification, more preferably between about 20% and about 60% amplification, and most preferably between about 30% and about 50% amplification. The amount of time and intensity of the physical agitation will be determined by the method and scale of production.

Figure 11:
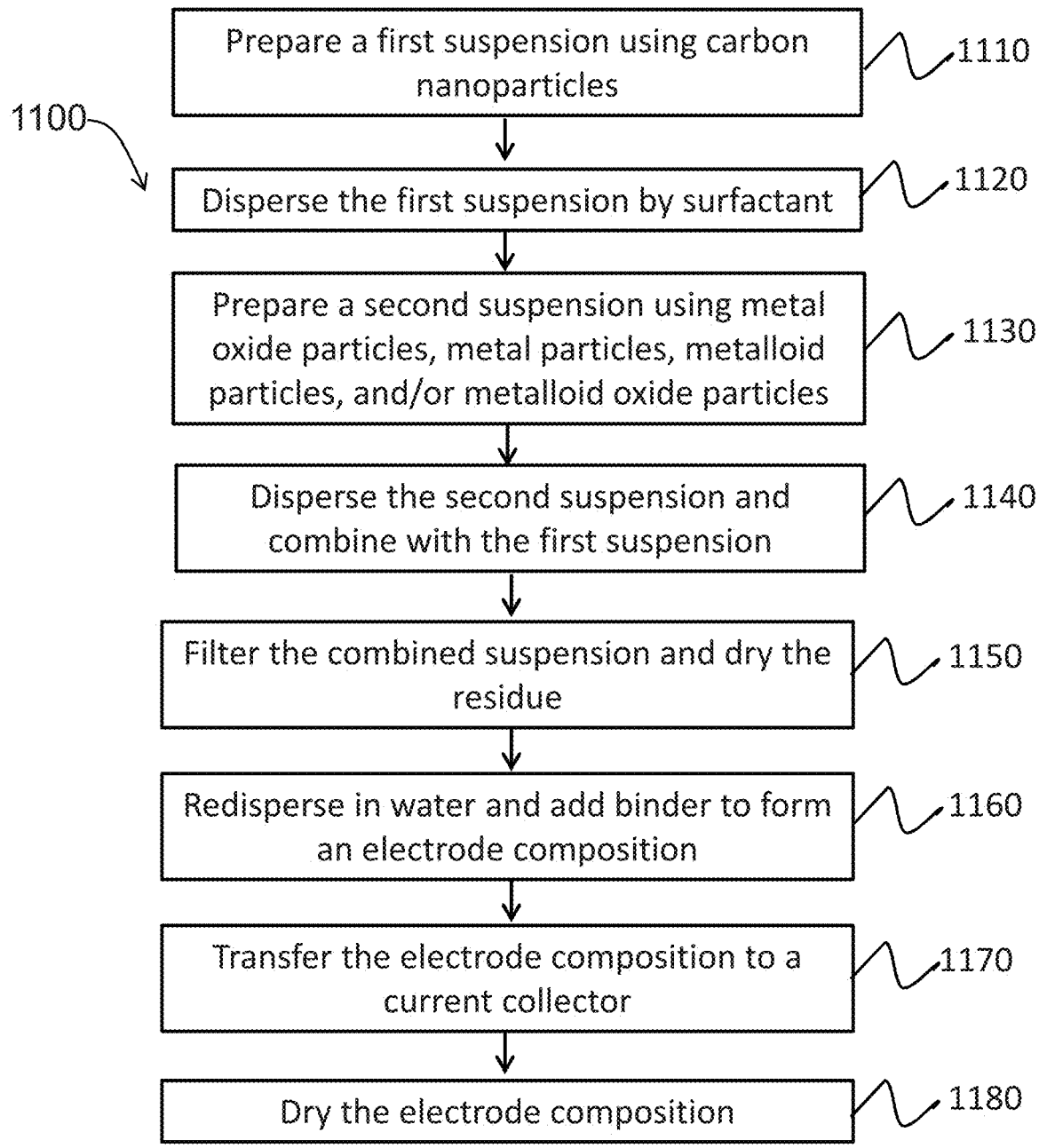
FIG. 11 is a flow diagram illustrating an example method of forming an electrode for an electrochemical battery cell.

FIG. 11 is a flow diagram illustrating an example method 1100 of forming an electrode, such as an anode or cathode for an electrochemical battery cell. Example method 1100 may include one or more operations, functions, or actions as illustrated by one or more of blocks 1110-1180. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the example method 1100 and other processes and methods disclosed herein, the flowchart shows functionality and operation of one possible implementation of present embodiments.

At block 1110, a first suspension is prepared using carbon nanoparticles. For example, a first suspension of carbon nanoparticles (for example, graphene, carbon nanotubes, or carbon nanofibers) is prepared in a fluid (for example, deionized water).

In certain examples, a surfactant is first dispersed (for example, using ultrasonication or centrifugation) in a fluid (for example, deionized water) to form a clear solution in which the carbon nanoparticle is then added to prepare the first suspension. In certain examples, the suspension can be mixed by stirring the solution (for example, using a magnetic bar).

At block 1120, material in the first suspension is dispersed with a surfactant. Physical agitation, such as ultrasonication or centrifugation, can be used to disperse the carbon nanoparticles in the first suspension. In certain examples, stirring of the suspension can continue following dispersion by ultrasonication.

At block 1130, a second suspension is prepared using one or more of metal oxide particles, metal particles, metalloid particles, and/or metalloid oxide particles. For example, a second suspension of metal oxide particles, metal particles, metalloid particles, and/or metalloid oxide particles (for example, a suspension of iron oxide or silicon particles) is prepared in a fluid (for example, deionized water).

In certain examples, rather than forming a separate second suspension, the second suspension is formed from the first suspension by adding the one or more of metal oxide particles, metal particles, metalloid particles, and/or metalloid oxide particles to the first suspension. In other examples, the second suspension is formed separately from the first suspension, mixed, and added to the first suspension.

At block 1140, material in the second suspension is dispersed and combined with the first suspension. For example, ultrasonication or centrifugation can be used to disperse the nanoparticles in the second suspension.

At block 1150, the combined first and second suspensions are filtered (for example, using a funnel or filter and vacuum) and dried into a residue. Residue can then be scraped off of the filter and ground (for example, using a mortar and pestle or milling techniques).

At block 1160, a binder is added to form an electrode composition. In certain embodiments, the combined residue of the first and second suspensions can be redispersed in a fluid (for example, deionized water) prior to adding the binder. In certain embodiments, a binder can be added to the combined suspension followed by further dispersion (for example, using ultrasonication or centrifugation) of the combined suspension to form an electrode composition. In certain embodiments, a slurry is prepared using the ground residue of carbon nanoparticle and at least one of metal oxide particles, metal particles, metalloid particles, and/or metalloid oxide particles with a fluid (for example, deionized water), which may contain binder.

In certain examples, one or more optional ingredients including, but not limited to, adhesion and hardening promoters, antioxidants, buffering agents, corrosion inhibitors, diluents, electrolytes, fluids (for example, hydrophilic fluid or hydrophobic fluid), friction modifiers, scale inhibitors, thickening agent, and/or conductive aids can be added to the first suspension, second suspension and/or resulting mixture.

At block 1170, the electrode composition is transferred to a current collector to form one or more electrodes. For example, the electrode composition is sprayed, applied by doctor blade and/or otherwise applied in a layer on a copper foil and may include further or subsequent compression of the electrode composition. In alternate embodiments, the electrode composition is formed as a free-standing film or membrane.

At block 1180, electrode composition is dried. For example, the current collector is heated to dry the material remaining on the current collector to form dried electrode material. In an alternate embodiment, where the electrode is a free-standing film or membrane, the dried electrode composition is separated and formed into one or more electrodes.

In certain examples, a resulting electrode has a specific capacity of at least 450 mAh/g, preferably of at least 600 mAh/g, of active material when cycled at a charge/discharge rate of about 0.1C. Electrodes used in cell assembly to form one or more batteries (for example, as anode and/or cathode for one or more batteries). For example, one or more lithium-ion batteries (for example, a coin cell battery, automotive battery, computer battery, or cell phone battery) can be formed using the dried electrode composition.

EXAMPLES

Comparative Example 1

As a comparative example, a $Fe_2O_3$/graphene anode was prepared without using a surfactant in the material preparation process. A graphene suspension was prepared by adding 0.04 g $Fe_2O_3$ nanoparticle into 20 ml deionized water. The graphene suspension was mixed with a magnetic stirring bar at 800 revolutions per minute (rpm) for 2 hours, and further dispersed by ultrasonication using a Misonix Sonicator (S-4000) for 15 minutes at 30 W power output. The graphene suspension was then transferred back on the magnetic plate and stirring was continued. A $Fe_2O_3$ nanoparticle suspension was prepared by mixing 0.12 g $Fe_2O_3$ nanoparticle into 60 ml deionized water and stirred by a mechanical method for 2 hours. The suspension was then subject to ultrasonication using a Misonix Sonicator (S-4000) for 5 minutes at 30 W power output. The as-prepared 20 ml graphene suspension was then transferred into the $Fe_2O_3$ nanoparticle suspension slowly. The mixture was sonicated for a total of 30 min with a 5 min interval of rest after 15 minutes of ultrasonication. 0.8 grams of polyacrylic acid (PAA) binder in 5 wt. % water solution was last added into the suspension, and the final mixture was further sonicated for another 15 min. The obtained mixture was sprayed onto a heated copper foil (current collector) at 140° C. using a Paasche Air Brush Kit. Compressed air was used as carrying gas and the pressure was controlled at 18 psi. The distance between the nozzle and the current collector was kept in the range of 10-20 cm. The obtained electrodes were transferred in a vacuum oven and heated at 80° C. for 16 hours. The formed electrode composition was punched into 2.5 cm diameter pellets, and then transferred to an argon gas filled glove box for cell assembly. The pellet was assembled into CR2032 type of coin cell battery with lithium foil as counter electrode. 1M $LiPF_6$ in a mixture of ethylene carbonate/diethylene carbonate at 1:1 volume ratio was used as electrolyte solution, Celgard®3501 micro-porous membrane was used as separator. The cell was cycled by discharge-charge between 0.05 and 3V (vs. Li/Li+) using an Arbin™ battery test station at a rate of 0.1C. The discharge capacity over multiple cycles for this anode material, in which no surfactant was used in the material preparation is shown in FIG. 8, from which it can be seen that there is rapid fade of capacity with cycling.

Specific Example 2

A $Fe_2O_3$/graphene anode was prepared using surfactant in the material preparation process as follows. Ultrasonication was performed with a Branson Model 450 Digital Sonifier with a ½" disrupter horn. Initially, 1 g surfactant (sodium dodecylbenzenesulfonate) was first dispersed in deionized water by sonicating for 15 minutes with the amplitude of 20% until a clear solution was achieved. Then, 0.05 g graphene was added to the solution and sonicated for an additional 15 minutes with the same amplitude, repeated twice. Finally, 1.5 g $Fe_2O_3$ nanoparticles were added to the mixture and sonicated for 30 minutes. The prepared fluids were added to the funnel connected with vacuum filtration. When the liquid level approached the bottom of the funnel, more deionized water is added. 150 ml water was used. The filter was taken out of the funnel and left in the vacuum oven (80° C., 20 inches of mercury) for 12 h. The sample was then scraped off the filter and ground by marble pestle and mortar. The electrode comprising metal oxide and graphene were prepared using a slurry spray technique. 0.05 grams of electrode composition consisting of 75 wt. % $Fe_2O_3$ nanoparticles, 25 wt. % graphene, and was further mixed with 0.25 grams of PAA in 5 wt. % water solution. The ratio of the active material ($Fe_2O_3$ nanoparticles/graphene composite material) to PAA was 8:2. 10 ml deionized water was added into the slurry. The slurry was mixed by mechanical stirring method for 4 hours. The obtained slurry was sprayed onto a heated copper foil (current collector) at 140° C. using a Paasche Air Brush Kit. Compressed air was used as carrying gas and the pressure was controlled at 18 psi. The distance between the nozzle and the current collector was kept in the range of 10-20 cm. The obtained electrodes were transferred to a vacuum oven and heated at 80° C. for 16 hours. The formed electrode composition was then punched into 2.5 cm diameter pellets, then transferred to an argon gas filled glove box for cell assembly. The pellet was assembled into CR2032 type of coin cell battery with lithium foil as counter electrode. 1M lithium hexafluorophosphate ($LiPF_6$) in a mixture of ethylene carbonate/diethylene carbonate at 1:1 volume ratio was used as electrolyte solution, Celgard® 3501 micro-porous membrane was used as separator. The cell was cycled by discharge-charge between 0.05 and 3V (vs. Li/Li+) using an Arbin™ battery test station at a rate of 0.1C. The discharge capacity over 94 cycles for this anode material, in which sodium dodecylbenzenesulfonate surfactant was used in the material preparation, is shown in FIG. 9, from which it can be seen that the anode capacity is in the region of 700 mAh/g and shows no indication of capacity fade. Stable cycling in the region of 750 mAh/g continues for this sample.

Specific Example 3

A silicon/C-SWNT anode was prepared using surfactant in the material preparation process as follows. Sonication was performed with a Branson Model 450 Digital Sonifier with a ½" disrupter horn. Initially, 0.5 g surfactant (benzyldodecyldimethylammonium bromide (BddaBr)) was first dispersed in deionized water by using sonication for 15 minutes with the amplitude of 20% until a clear solution was achieved. Then, 0.05 g single wall carbon nanotube (SWNT) was added to the solution and sonicated for an additional 15 minutes with the same amplitude, repeated for two times. Finally, 0.05 g Si nanoparticles (size 50-70 nm) were added to the mixture and sonicated for 10 minutes, with the amplitude of 15%. The prepared fluids were added to the funnel connected with vacuum filtration. When the liquid level approached the bottom of the funnel, more deionized water was added. 200 ml of water was used. The filter was taken out of the funnel and left in the vacuum oven (80° C., 20 inches of mercury) for 12 h. The sample was then scraped off the filter and ground by marble pestle and mortar. The electrode comprising silicon (Si) and carbon nanotube (CNT) were prepared using a slurry spray technique. 0.05 grams of electrode composition consisting of 50 wt. % Si nanoparticles, 50 wt. % CNTs, and was further mixed with 0.25 grams of PAA binder in 5 wt. % water solution. The ratio of the active material (Si nanoparticles-CNT composite material) to PAA was 8:2. 10 ml deionized water was added into the slurry. The slurry was mixed by mechanical stirring method for 4 hours. The obtained slurry was sprayed onto a heated copper foil (current collector) at 140° C. using a Paasche Air Brush Kit. Compressed air was used as carrying gas and the pressure was controlled at 18 psi. The distance between the nozzle and the current collector was kept in the range of 10-20 cm. The obtained electrodes were transferred in vacuum oven and heated at 80° C. for 16 hours. The formed electrode composition was then punched into 2.5 cm diameter pellets, then transferred to an argon gas filled glove box for cell assembly. The pellet was assembled into CR2032 type of coin cell battery with Lithium foil as counter electrode. 1M $LiPF_6$ in a mixture of ethylene carbonate/diethylene carbonate at 1:1 volume ratio was used as electrolyte solution, Celgard®3501 micro-porous membrane was used as separator. The cell was cycled by discharge-charge between 0.05 and 0.7 V (vs. Li/Li+) using an Arbin™ battery test station at a rate of 0.1C. The discharge capacity over 23 cycles for this anode material, in which benzyldodecyldimethylammonium bromide surfactant was used in the material preparation, is shown in FIG. 10, from which it can be seen that the anode capacity is in the region or 1200 mAh/g to 1300 mAh/g and shows no indication of capacity fade. Stable cycling in the region of 1250 mAh/g continues for this sample.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. An electrode comprising:
    (a) carbon nanoparticles; wherein said carbon nanoparticles are in an amount between 5 wt. % and 95 wt. % of an electrode composition;
    (b) at least one of metal particles, metal oxide particles, metalloid particles and metalloid oxide particles, wherein the at least one of metal particles, metal oxide particles, metalloid particles and metalloid oxide particles comprises silicon, a silicon oxide, or a combination or alloy thereof;
    (c) a surfactant attaching said carbon nanoparticles to said at least one of metal particles, metal oxide particles, metalloid particles and metalloid oxide particles thereby forming said electrode composition; wherein the surfactant is an anionic, cationic, zwitterionic, amphoteric, or ampholytic surfactant; and
    (d) 0.1 wt. % to 40 wt. % of a binder for forming said electrode composition into a film or membrane;
    wherein said electrode is an anode and has a specific capacity of at least 500 mAh/g of active material when cycled at a charge/discharge rate of about 0.1C.

2. The electrode of claim 1, wherein said carbon nanoparticles are selected from the group consisting of submicron carbon materials, nanoscale carbon materials, activated carbon nanoparticles, combinations thereof; wherein said nanoscale carbon materials are carbon particles having at least one dimension that is less than 100 nanometers, graphite nanoparticles, graphene nanoparticles, carbon nanotubes and carbon fibers.

3. The electrode of claim 1, wherein said surfactant is in an amount of between 0.01 wt. % and 10 wt. % comprises one of a sulfate group, a sulfonate group, pyridinium group and an ammonium group.

4. The electrode of claim 3, wherein said surfactant comprises at least one of sodium dodecylbenzenesulfonate (SDBS), sodium dodecyl sulfate (SDS), and benzyldodecyldimethylammonium bromide (BddaBr).

5. The electrode of claim 1, wherein said at least one of metal particles, metal oxide particles, metalloid particles and metalloid oxide particles further comprises at least one of the following: boron, tellurium, lanthanum, cerium, praseodymium, neodymium, promethium, samarium, europium, gadolinium, terbium, dysprosium, holmium, erbium, thulium, ytterbium, lutetium, cobalt, vanadium, manganese, niobium, iron, nickel, copper, titanium, zirconium, scandium, yttrium, tin, germanium, oxides of the aforementioned metals and metalloids, and alloys of said at least one of metal particles, metal oxide particles, metalloid particles, and metalloid oxide particles.

6. The electrode of claim 5, wherein said at least one of metal particles, metal oxide particles, metalloid particles and metalloid oxide particles further comprises at least one of the following oxides: $Al_2O_3$, CuO, MgO, $V_2O_5$, $BiO_2$, $Sb_2O_5$, $TiO_2$, ZnO, FeO, $Fe_2O_3$, $Fe_3O_4$, $CrO_3$, NiO, $Ni_2O_3$, CoO, $Co_2O_3$, and $Co_3O_4$; and wherein said electrode has specific capacity of at least 600 mAh/g of active material when cycled at a charge/discharge rate of about 0.1C.

7. The electrode of claim 5, wherein said at least one of metal particles, metal oxide particles, metalloid particles and metalloid oxide particles is in the form of nanoparticles.

8. The electrode of claim 1, wherein said surfactant has a net negative charge and a pH value greater than the pHpzc of said at least one of metal particles, metal oxide particles, metalloid particles and metalloid oxide particles.

9. The electrode of claim 8, wherein said surfactant is selected from the group consisting of sodium dodecylbenzenesulfonate (SDBS) and sodium dodecyl sulfate (SDS).

10. The electrode of claim 1, wherein said surfactant has a net positive charge and a pH value less than the pHpzc of said at least one of metal particles, metal oxide particles, metalloid particles and metalloid oxide particles.

11. The electrode of claim 10, wherein said surfactant is selected from the group consisting of cetyltrimethylammonium bromide (CTAB), benzyldodecyldimethylammonium bromide (BddaBr), benzyldimethylhexadecylammonium chloride (BdhaCl), didodecyldimethylammonium bromide (DDAB), amprolium hydrochloride (AH), and benzethonium chloride (BC).

12. The electrode of claim 1, wherein said carbon nanoparticles and said at least one of metal particles, metal oxide particles, metalloid particles and metalloid oxide particles are non-aggregating.

13. The electrode of claim 12, wherein said carbon nanoparticles and said at least one of metal particles, metal oxide particles, metalloid particles and metalloid oxide particles are dispersed homogeneously.

14. The electrode of claim 1, wherein said binder comprises at least one of polyvinylidene fluoride (PVDF), polyacrylic acid (PAA), carboxy methyl cellulose (CMC), polyalginate, polyvinyl alcohol (PVA), polyfluorenes, polyurethane, perfluorosulfonic acid polymers, polyethylenimines, poly(1,3-butadiene), poly(acrylonitrile-co-acrylamide), polystyrenebutadiene rubber, and poly(9,9-dioctylfluorene-co-9-fluorenone-co-methybenzoic ester) (PFM).

15. The electrode of claim 14, wherein said binder comprises polyacrylic acid (PAA).

16. The electrode of claim 1, further comprising:
    (e) a metallic current collector upon which said electrode composition is applied.

17. The electrode of claim 1, further comprising:
    (e) a non-metallic electrically conductive substrate upon which said electrode composition is applied.

18. A battery comprising an anode, a cathode, and an electrolyte interposed therebetween, wherein said anode comprises:
    (a) carbon nanoparticles, wherein said carbon nanoparticles are in an amount between 5 wt. % and 95 wt. % of an anode composition;
    (b) at least one of metal particles, metal oxide particles, metalloid particles and metalloid oxide particles, wherein the at least one of metal particles, metal oxide particles, metalloid particles and metalloid oxide particles comprises silicon, a silicon oxide, or combination or alloy thereof;
    (c) a surfactant attaching said carbon nanoparticles to said at least one of metal particles, metal oxide particles, metalloid particles and metalloid oxide particles to form said anode composition; wherein the surfactant is an anionic, cationic, zwitterionic, amphoteric, or ampholytic surfactant;
    (d) 0.1 wt. % to 40 wt. % of a binder for forming said anode composition into a film or membrane;
    wherein said anode has a specific capacity of at least 500 mA-h/g of active material when cycled at a charge/discharge rate of about 0.1C.

19. The battery of claim 18, wherein said surfactant is in an amount of between 0.01 wt. % and 10 wt. % comprises one of a sulfate group, a sulfonate group, pyridinium group and an ammonium group.

20. The battery of claim 18, wherein said carbon nanoparticles are selected from the group consisting of submicron carbon materials, nanoscale carbon materials, activated carbon nanoparticles, combinations thereof; wherein said nanoscale carbon materials are carbon particles having at least one dimension that is less than 100 nanometers, graphite nanoparticles, graphene nanoparticles, carbon nanotubes and carbon fibers; and wherein said at least one of metal particles, metal oxide particles, metalloid particles and metalloid oxide particles further comprises at least one of the following: boron, tellurium, lanthanum, cerium, praseodymium, neodymium, promethium, samarium, europium, gadolinium, terbium, dysprosium, holmium, erbium, thulium, ytterbium, lutetium, cobalt, vanadium, manganese, niobium, iron, nickel, copper, titanium, zirconium, scandium, yttrium, tin, germanium, oxides of the aforementioned metals and metalloids, or alloys thereof.

21. The battery of claim 18, further comprising a separator, separating the anode and the cathode.

22. An electrode prepared by the process of:
(a) combining with a surfactant, carbon nanoparticles, and at least one of metal particles, metal oxide particles, metalloid particles and metalloid oxide particles to form an electrode composition, wherein the at least one of metal particles, metal oxide particles, metalloid particles and metalloid oxide particles comprises silicon, a silicon oxide, or combination or alloy thereof; wherein the surfactant is an anionic, cationic, zwitterionic, amphoteric, or ampholytic surfactant, and wherein the surfactant attaches the carbon nanoparticles to the at least one of metal particles, metal oxide particles, metalloid particles and metalloid oxide particles;
(b) combining said electrode composition with a binder;
(c) applying said electrode composition as a layer on a current collector, or forming said electrode composition as a free-standing film or membrane;
wherein said carbon nanoparticles are in an amount between 5 wt. % and 95 wt. % of said electrode composition; and
wherein said electrode is an anode and has a specific capacity of at least 500 mA-h/g of active material when cycled at a charge/discharge rate of about 0.1C.

23. The electrode of claim 22, wherein steps (a), (b), and (c) are performed sequentially.

24. The electrode of claim 22, wherein said carbon nanoparticles are selected from the group consisting of submicron carbon materials, nanoscale carbon materials, activated carbon nanoparticles, combinations thereof; wherein said nanoscale carbon materials are carbon particles having at least one dimension that is less than 100 nanometers, graphite nanoparticles, graphene nanoparticles, carbon nanotubes and carbon fibers.

25. The electrode of claim 22, wherein said surfactant is in an amount of between 0.01 wt. % and 10 wt. % comprises one of a sulfate group, a sulfonate group, pyridinium group and an ammonium group.

26. The electrode of claim 22, wherein said at least one of metal particles, metal oxide particles, metalloid particles and metalloid oxide particles further comprises at least one of the following: lanthanum, boron, tellurium, cerium, praseodymium, neodymium, promethium, samarium, europium, gadolinium, terbium, dysprosium, holmium, erbium, thulium, ytterbium, lutetium, cobalt, vanadium, manganese, niobium, iron, nickel, copper, titanium, zirconium, scandium, yttrium, tin, germanium, oxides of the aforementioned metals and metalloids, and alloys of said at least one of metal particles, metal oxide particles, metalloid particles, and metalloid oxide particles.

27. The electrode of claim 26, wherein said at least one of metal particles, metal oxide particles, metalloid particles and metalloid oxide particles further comprises at least one of the following oxides: $Al_2O_3$, $CuO$, $MgO$, $V_2O_5$, $BiO_2$, $Sb_2O_5$, $TiO_2$, $ZnO$, $FeO$, $Fe_2O_3$, $Fe_3O_4$, $CrO_3$, $NiO$, $Ni_2O_3$, $CoO$, $Co_2O_3$, and $Co_3O_4$; and wherein said electrode has specific capacity of at least 600 mAh/g of active material when cycled at a charge/discharge rate of about 0.1C.

28. The electrode of claim 22, wherein said at least one of metal particles, metal oxide particles, metalloid particles and metalloid oxide particles is in the form of nanoparticles.

* * * * *

UNITED STATES PATENT AND TRADEMARK OFFICE
CERTIFICATE OF CORRECTION

PATENT NO. : 10,950,847 B2
APPLICATION NO. : 15/492153
DATED : March 16, 2021
INVENTOR(S) : Haiping Hong et al.

It is certified that error appears in the above-identified patent and that said Letters Patent is hereby corrected as shown below:

On the Title Page

Item (72) Inventors, at Line 5:
INSERT: --Hammad A. Younes, Rapid City, SD (US)--

Signed and Sealed this
Twentieth Day of June, 2023

Katherine Kelly Vidal
*Director of the United States Patent and Trademark Office*